US012580248B2

(12) United States Patent
Sprague et al.

(10) Patent No.: US 12,580,248 B2
(45) Date of Patent: Mar. 17, 2026

(54) COOLING ARRANGEMENTS FOR BATTERY-POWERED STAND-ALONE MOTOR UNIT

(71) Applicant: MILWAUKEE ELECTRIC TOOL CORPORATION, Brookfield, WI (US)

(72) Inventors: Connor P. Sprague, Milwaukee, WI (US); Evan M. Glanzer, Milwaukee, WI (US); John E. Koller, Brookfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 1007 days.

(21) Appl. No.: 17/092,882

(22) Filed: Nov. 9, 2020

(65) Prior Publication Data

US 2021/0143499 A1 May 13, 2021

Related U.S. Application Data

(60) Provisional application No. 62/945,343, filed on Dec. 9, 2019, provisional application No. 62/932,708, filed on Nov. 8, 2019.

(51) Int. Cl.
*H01M 10/6563* (2014.01)
*H01M 10/42* (2006.01)
(Continued)

(52) U.S. Cl.
CPC ..... *H01M 10/6563* (2015.04); *H01M 10/425* (2013.01); *H01M 10/613* (2015.04);
(Continued)

(58) Field of Classification Search
CPC ........... H01M 10/6563; H01M 10/613; H01M 10/643; H01M 10/6556; H01M 10/66;
(Continued)

(56) References Cited

U.S. PATENT DOCUMENTS

| | | | |
|---|---|---|---|
| 4,314,831 A | 2/1982 | Barbic | |
| 6,084,772 A | 7/2000 | Pell et al. | |
| (Continued) | | | |

FOREIGN PATENT DOCUMENTS

| | | | |
|---|---|---|---|
| CN | 101456181 A | 6/2009 | |
| CN | 211000893 U | 7/2020 | |
| (Continued) | | | |

OTHER PUBLICATIONS

International Search Report and Written Opinion for Application No. PCT/US2020/059656 dated Mar. 2, 2021 (13 pages).

(Continued)

*Primary Examiner* — Michael Andrews
(74) *Attorney, Agent, or Firm* — Michael Best & Friedrich LLP

(57) ABSTRACT

A stand-alone motor unit for use with a piece of power equipment includes a housing, an electric motor, a first fan driven by the electric motor and configured to induce an airflow through the electric motor, a power take-off shaft receiving torque from the motor, and control electronics positioned within the housing and electrically connected to the electric motor. The motor unit also includes a battery pack, and a battery receptacle coupled to the housing and engageable with the battery pack to transfer current between the battery pack and the electric motor. The motor unit further includes an auxiliary cooling system located within the housing. The auxiliary cooling system includes a heat sink coupled to the control electronics, and a second fan configured to direct an airflow across the heat sink separate from the airflow induced through the electric motor by the first fan.

11 Claims, 25 Drawing Sheets

(51) Int. Cl.

| | | |
|---|---|---|
| *H01M 10/613* | (2014.01) | |
| *H01M 10/643* | (2014.01) | |
| *H01M 10/6556* | (2014.01) | |
| *H01M 10/66* | (2014.01) | |
| *H01M 50/213* | (2021.01) | |
| *H02K 5/18* | (2006.01) | |
| *H02K 11/00* | (2016.01) | |

(52) U.S. Cl.
CPC ..... *H01M 10/643* (2015.04); *H01M 10/6556* (2015.04); *H01M 10/66* (2015.04); *H01M 50/213* (2021.01); *H02K 5/18* (2013.01); *H02K 11/0094* (2013.01)

(58) Field of Classification Search
CPC .... H01M 10/425; H01M 50/213; H02K 5/18; H02K 11/0094; H02K 7/14; H02K 7/145; H02K 9/06; H02K 9/04
USPC ...................................................... 310/52, 50
See application file for complete search history.

(56) References Cited

U.S. PATENT DOCUMENTS

| | | | |
|---|---|---|---|
| 6,692,864 | B1 | 2/2004 | Dansui et al. |
| 7,493,696 | B2 | 2/2009 | Suzuki et al. |
| 7,493,697 | B2 | 2/2009 | Yoshida |
| 7,786,627 | B2 | 8/2010 | Riedl |
| 8,556,018 | B2 | 10/2013 | Fujihara et al. |
| 8,708,599 | B2 | 4/2014 | Steffen |
| 9,991,825 | B1 | 6/2018 | Ackerman et al. |
| 10,111,383 | B2 | 10/2018 | Yamaoka et al. |
| 10,439,465 | B2 | 10/2019 | Kaneko et al. |
| 10,734,870 | B2 | 8/2020 | Butzmann et al. |
| 10,873,232 | B2 | 12/2020 | Kaneko et al. |
| 2002/0007956 | A1* | 1/2002 | Bongers-Ambrosius .................... B23Q 11/127 173/201 |
| 2006/0090351 | A1 | 5/2006 | Yoshida |
| 2008/0102355 | A1* | 5/2008 | Moores ............... H01M 10/486 429/96 |
| 2010/0025006 | A1 | 2/2010 | Zhou |

| | | | |
|---|---|---|---|
| 2011/0100253 | A1* | 5/2011 | Koyama ................ H02K 11/33 105/34.1 |
| 2013/0076172 | A1* | 3/2013 | Koyama .................. H02K 9/14 310/63 |
| 2014/0345827 | A1 | 11/2014 | Matsuda |
| 2016/0207386 | A1 | 7/2016 | Nagaosa |
| 2017/0163125 | A1* | 6/2017 | Granat ..................... H02K 9/18 |
| 2017/0271941 | A1 | 9/2017 | Kaneko et al. |
| 2018/0138839 | A1 | 5/2018 | Puzio et al. |
| 2018/0331597 | A1 | 11/2018 | Schulenberg |
| 2019/0006980 | A1 | 1/2019 | Sheeks et al. |
| 2019/0232478 | A1* | 8/2019 | Zawisza ................ B25D 17/04 |
| 2019/0341826 | A1 | 11/2019 | Zeiler et al. |
| 2019/0393757 | A1 | 12/2019 | Li et al. |
| 2020/0076337 | A1 | 3/2020 | Abbott et al. |
| 2020/0196522 | A1 | 6/2020 | Feng et al. |
| 2020/0204043 | A1 | 6/2020 | Matsushima |

FOREIGN PATENT DOCUMENTS

| | | | |
|---|---|---|---|
| EP | 1174213 | A1 | 1/2002 |
| EP | 1178557 | A2 | 2/2002 |
| EP | 3648315 | A1 | 5/2020 |
| FR | 2500776 | A1 | 9/1982 |
| JP | H06199139 | A | 7/1994 |
| JP | 2004332744 | A | 11/2004 |
| KR | 940018062 | U | 7/1994 |
| KR | 2019950009264 | Y1 | 10/1995 |
| TW | I661658 | B | 6/2019 |
| WO | 2010071539 | A1 | 6/2010 |
| WO | 2010071540 | A1 | 6/2010 |
| WO | 2018067506 | A1 | 4/2018 |
| WO | 2018081397 | A1 | 5/2018 |
| WO | 2018165453 | A1 | 9/2018 |
| WO | 2018165513 | A1 | 9/2018 |
| WO | 2019058439 | A1 | 3/2019 |
| WO | 2020049617 | A1 | 3/2020 |

OTHER PUBLICATIONS

Partial Supplementary European Search Report for Application No. 20883954.8 dated Feb. 13, 2024 (23 pages).

* cited by examiner

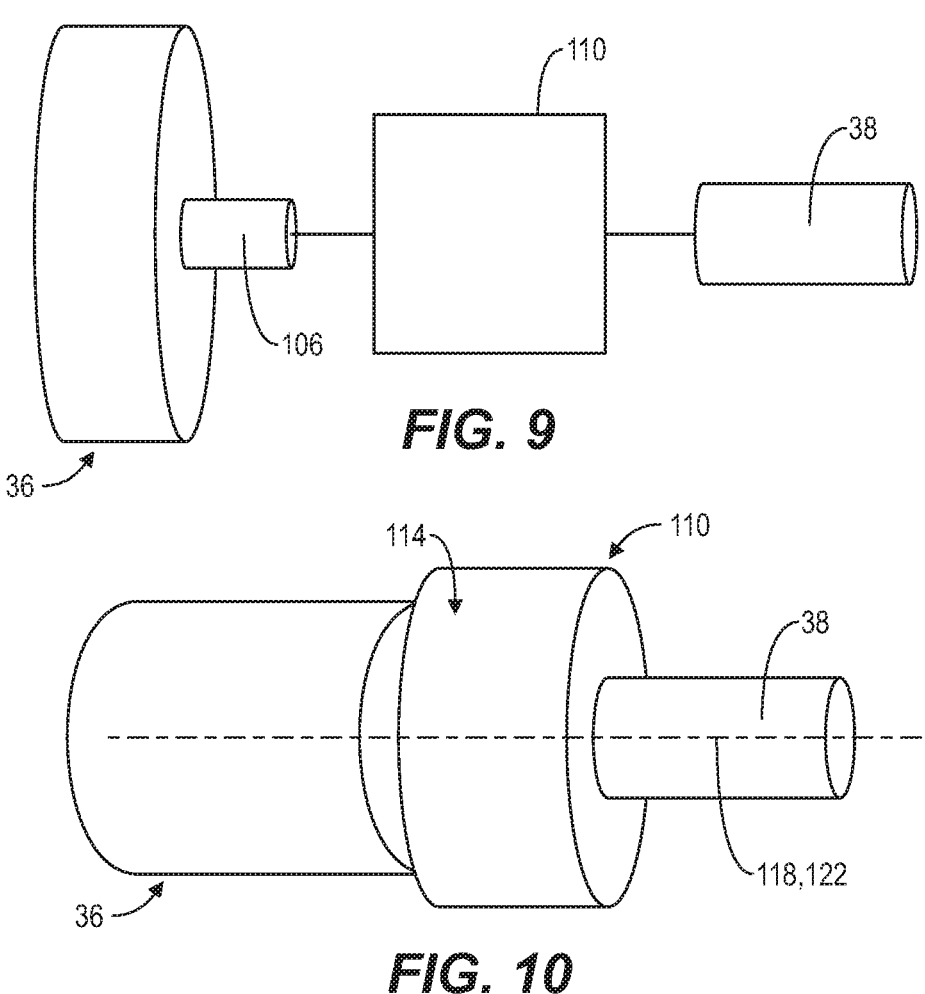
FIG. 9
FIG. 10
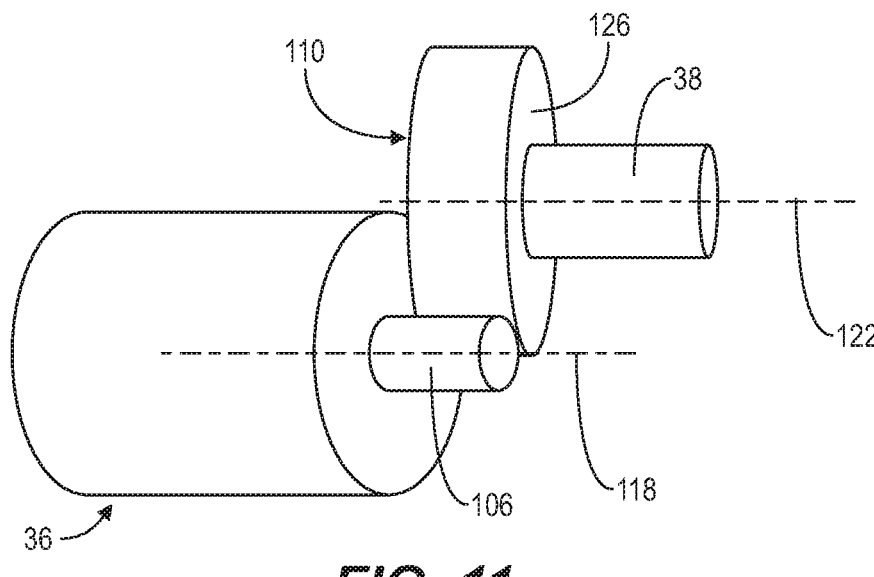
FIG. 11

COOLING ARRANGEMENTS FOR BATTERY-POWERED STAND-ALONE MOTOR UNIT

CROSS-REFERENCE TO RELATED APPLICATIONS

This application claims priority to U.S. Provisional Patent Application No. 62/945,343, filed Dec. 9, 2019, and to U.S. Provisional Patent Application No. 62/932,708, filed Nov. 8, 2019, the entire contents of each of which are hereby incorporated by reference.

FIELD OF THE INVENTION

The present invention relates to motor units, and more particularly to motor units for use with power equipment.

BACKGROUND OF THE INVENTION

Electric motors and their control electronics generate heat during operation.

SUMMARY OF THE INVENTION

The present invention provides, in one aspect, a stand-alone motor unit for use with a piece of power equipment. The motor unit includes a housing, an electric motor, a first fan driven by the electric motor and configured to induce an airflow through the electric motor, a power take-off shaft receiving torque from the motor, and control electronics positioned within the housing and electrically connected to the electric motor. The motor unit also includes a battery pack, and a battery receptacle coupled to the housing and engageable with the battery pack to transfer current between the battery pack and the electric motor. The motor unit further includes an auxiliary cooling system located within the housing. The auxiliary cooling system includes a heat sink coupled to the control electronics, and a second fan configured to direct an airflow across the heat sink separate from the airflow induced through the electric motor by the first fan.

The present invention provides, in another aspect, a stand-alone motor unit for use with a piece of power equipment. The motor unit includes a housing, an electric motor, a fan driven by the electric motor and configured to induce an airflow through the electric motor, and a power take-off shaft receiving torque from the electric motor. The motor unit also includes control electronics positioned within the housing and electrically connected to the electric motor. The motor unit further includes a battery pack, and a battery receptacle coupled to the housing and engageable with the battery pack to transfer current between the battery pack and the electric motor. The motor unit also includes an air cooling system located within the housing. The air cooling system includes a heat sink coupled to the control electronics, and a duct extending between the electric motor and the heat sink. The duct is configured to draw the airflow induced by the fan around the heat sink prior to the airflow passing through the electric motor, therefore cooling the heat sink with the airflow induced by the fan.

The present invention provides, in another aspect, a stand-alone motor unit for use with a piece of power equipment. The motor unit includes a housing, and an electric motor including a motor fan and a motor fan outlet for discharging an airflow generated by the motor fan. The motor unit also includes a gear case to which the electric motor is mounted, and a power take-off shaft receiving torque from the electric motor and protruding from the gear case. The motor unit further includes control electronics mounted to the gear case and positioned within the housing, the control electronics being electrically connected to the electric motor. The motor unit also includes a battery pack, and a battery receptacle coupled to the housing and engageable with the battery pack to transfer current between the battery pack and the electric motor. The motor fan outlet is positioned adjacent the gear case such that the airflow discharged from the motor fan passes over the control electronics and the gear case to cool the control electronics.

In some embodiments, the motor unit further includes a plurality of fins coupled to the gear case proximate the motor fan outlet such that the airflow discharged from the motor fan passes between the fins to cool the gear case and the control electronics.

The present invention provides, in another aspect, a stand-alone motor unit for use with a piece of power equipment. The motor unit includes a housing, an electric motor, a power take-off shaft receiving torque from the electric motor, and control electronics positioned within the housing and electrically connected to the electric motor. The motor unit also includes a battery pack, and a battery receptacle coupled to the housing and engageable with the battery pack to transfer current between the battery pack and the electric motor. The motor unit further includes a cooling circuit including a heat exchanger and a pump. The heat exchanger is coupled to at least one of the electric motor or the control electronics. The pump is configured to circulate a working fluid through the heat exchanger to absorb heat therefrom.

In some embodiments, the electric motor has a power output of at least about 2760 W and a nominal outer diameter of up to about 80 mm, the battery pack includes a pack housing and battery cells supported by the pack housing, and the battery cells are electrically connected and have a nominal voltage of up to about 80 V. In some embodiments, the working fluid is a single-phase working fluid, and the single-phase working fluid is in a liquid phase upon exiting the heat exchanger. In some embodiments, the working fluid is a two-phase working fluid, and the two-phase working fluid is in a gaseous phase upon exiting the heat exchanger. In some embodiments, the heat exchanger is a first heat exchanger coupled to the electric motor, and the cooling circuit further comprises a second heat exchanger coupled to the control electronics. In some embodiments, the cooling circuit further includes a radiator configured to remove heat from the working fluid after passing through the first and second heat exchangers. In some embodiments, the pump receives torque from the electric motor to circulate the working fluid through the heat exchanger. In some embodiments, the electric motor is a first electric motor, and the cooling circuit further includes a second electric motor configured to drive the pump to circulate the working fluid through the heat exchanger without using torque from the first electric motor.

The present invention provides, in another aspect, a stand-alone motor unit for use with a piece of power equipment. The motor unit includes a housing, an electric motor, a power take-off shaft receiving torque from the electric motor, and control electronics positioned within the housing and electrically connected to the electric motor. The motor unit also includes a battery pack, and a battery receptacle coupled to the housing and engageable with the battery pack to transfer current between the battery pack and the electric motor. The motor unit further includes a liquid cooling subassembly including a heat exchanger, a supply connector in fluid communication with the heat exchanger, and a return connector in fluid communication with the heat exchanger. The heat exchanger is coupled to at least one of the electric motor or the control electronics. The supply connector is configured to receive a cooling fluid from a remote source.

The present invention provides, in another aspect, a stand-alone motor unit for use with a piece of power equipment. The motor unit includes a housing defining a vent, and an electric motor including a motor fan configured to draw an airflow into the housing through the vent. The motor unit also includes a gear case to which the electric motor is mounted, and a power take-off shaft receiving torque from the electric motor and protruding from the gear case. The motor unit further includes control electronics mounted to the gear case and positioned within the housing, the control electronics being electrically connected to the electric motor. The motor unit also includes a battery pack, and a battery receptacle coupled to the housing and engageable with the battery pack to transfer current between the battery pack and the electric motor. The motor unit further includes a filter receptacle defined within the housing. The filter receptacle is configured to removably receive an air filter such that the airflow drawn through the vent is filtered through the air filter.

The present invention provides, in another aspect, a stand-alone motor unit for use with a piece of power equipment. The motor unit includes a housing, an electric motor, and a power take-off shaft receiving torque from the electric motor. The electric motor includes a motor fan and a motor fan outlet for discharging an airflow generated by the motor fan. The motor unit also includes control electronics positioned within the housing and electrically connected to the electric motor. The motor unit further includes a battery pack, a battery receptacle, and a ducted cooling system. The battery receptacle is coupled to the housing and engageable with the battery pack to transfer current between the battery pack and the electric motor. The ducted cooling system is located within the housing and includes a duct extending between the motor fan outlet and at least one of the control electronics and the battery receptacle. The duct is configured to direct the airflow discharged from the motor fan outlet toward at least one of the control electronics and the battery receptacle to cool at least one of the control electronics and the battery pack.

Other features and aspects of the invention will become apparent by consideration of the following detailed description and accompanying drawings.

BRIEF DESCRIPTION OF THE DRAWINGS

FIG. 9 is a schematic view of a motor, a gear train, and a power take-off shaft of the stand-alone motor unit of FIG. 1.

FIG. 10 is a schematic view of a motor, a gear train, and a power take-off shaft of the stand-alone motor unit of FIG. 1 in a first configuration.

FIG. 11 is a schematic view of a motor, a gear train, and a power take-off shaft of the stand-alone motor unit of FIG. 1 in a second configuration.

Figures 1, 2:
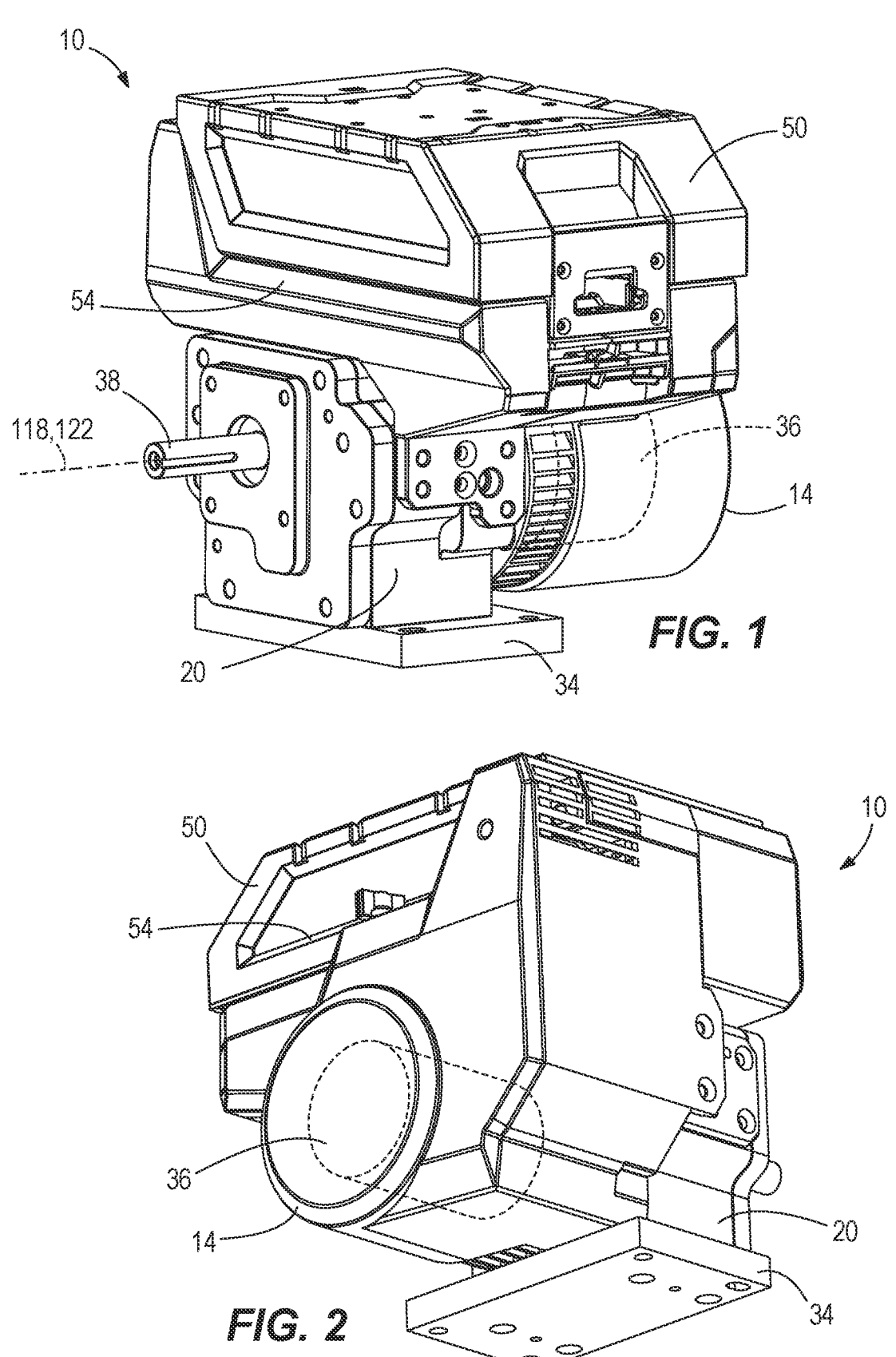
FIG. 1 is a perspective view of a stand-alone motor unit in accordance with an embodiment of the invention.
FIG. 2 is another perspective view of the stand-alone motor unit of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-3 and 13 illustrate a stand-alone motor unit 10 for use with a piece of power equipment. A similar stand-alone motor unit is described and illustrated in U.S. patent application Ser. No. 16/551,197 filed on Aug. 26, 2019, the entire content of which is incorporated herein by reference. The stand-alone motor unit 10 includes a housing 14. The motor unit 10 also includes a gear case 20 coupled to the housing 14, a base plate or flange 34 coupled to the gear case 20, an electric motor 36 located at least partly within the housing

Figure 3:
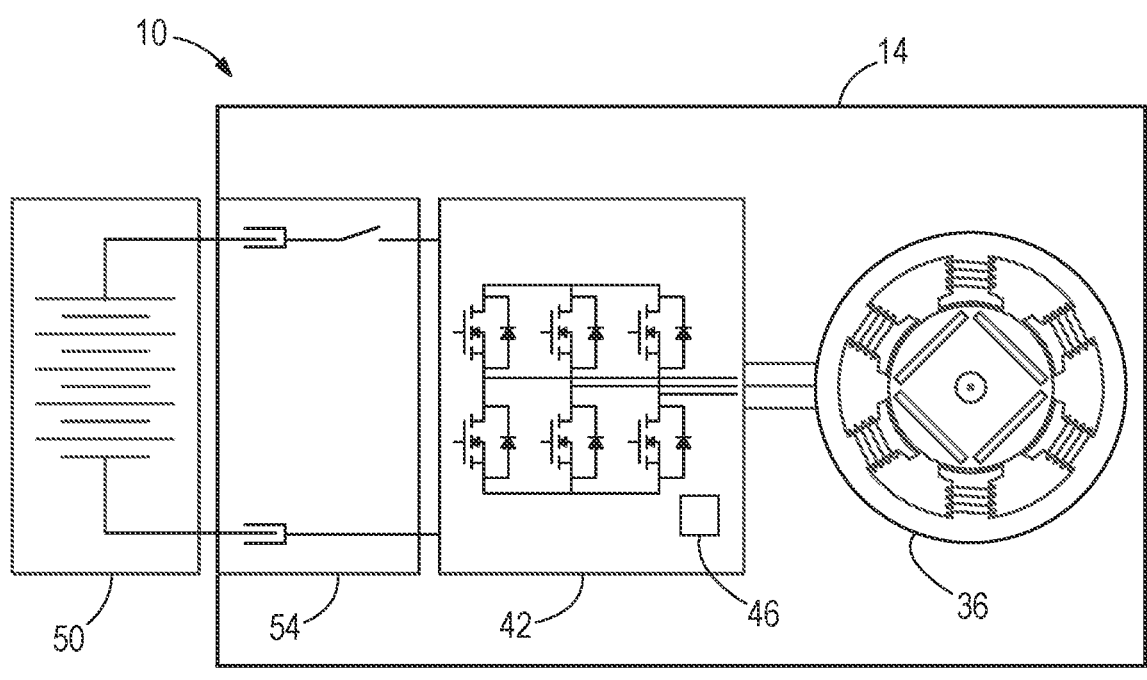
FIG. 3 is a schematic view of the stand-alone motor unit of FIG. 1.
Figure 13:
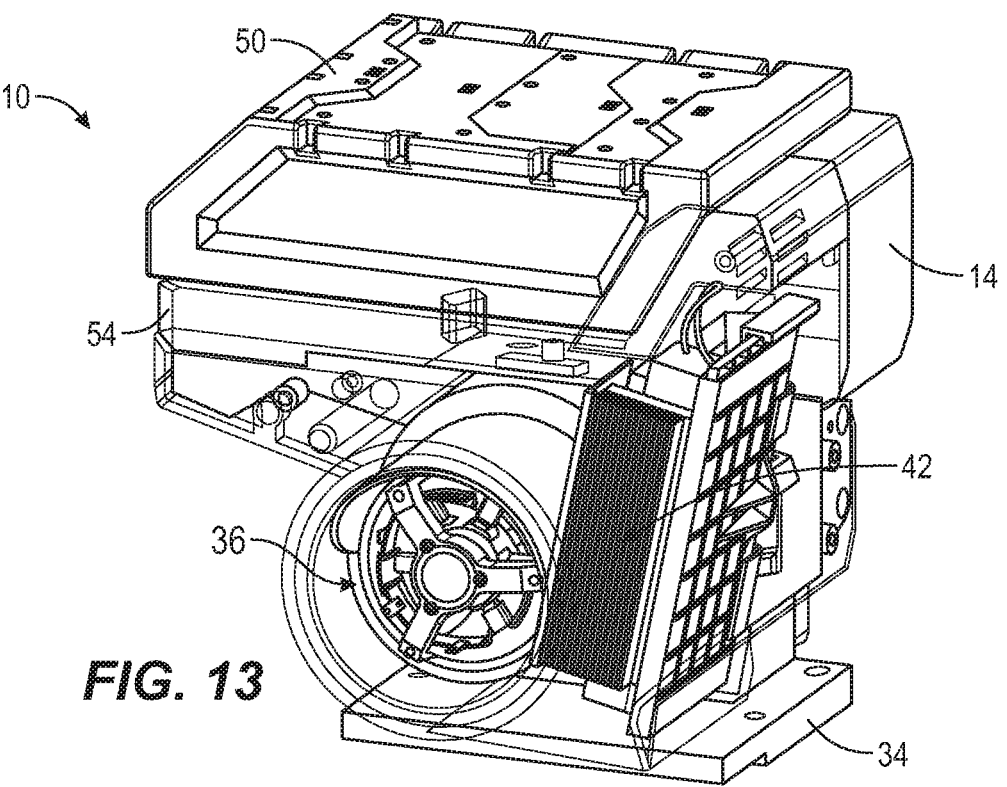
FIG. 13 is a perspective view of the stand-alone motor unit of FIG. 1 with portions removed.
Figure 14:
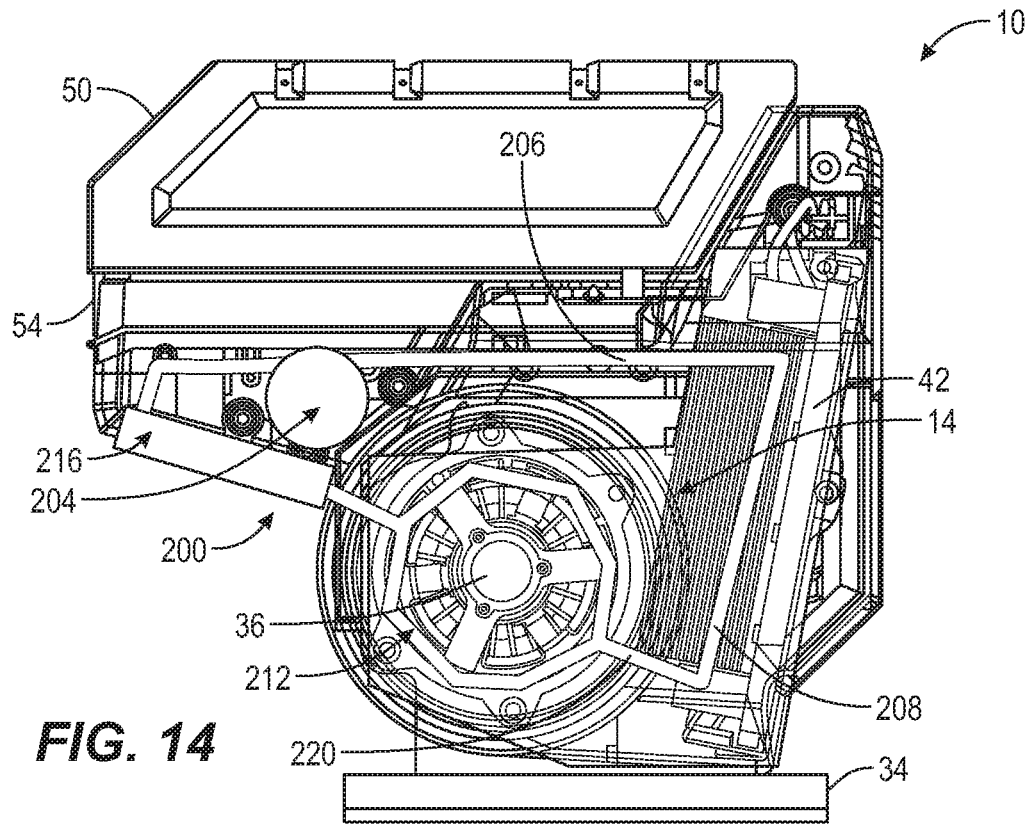
FIG. 14 is a side view of the stand-alone motor unit of FIG. 1 including a liquid cooling circuit.
Figure 15:
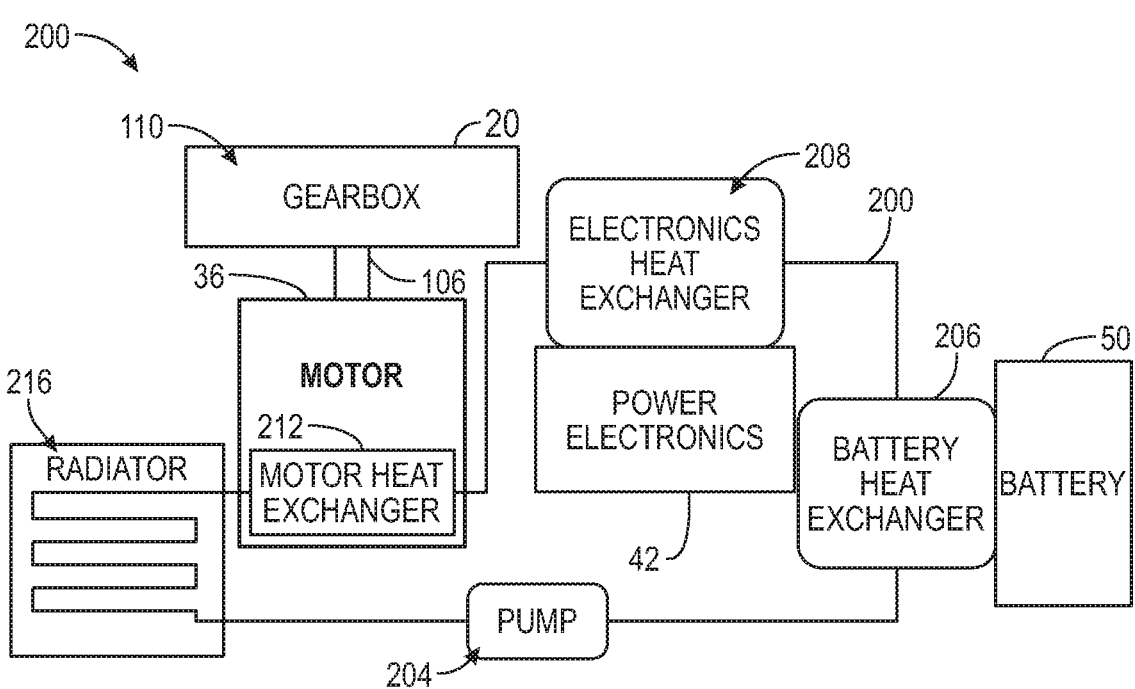
FIG. 15 is a schematic view of a liquid cooling circuit of the stand-alone motor unit of FIG. 1 in a first configuration.

14, and a power take-off shaft 38 that protrudes from the gear case 20 and receives torque from the motor 36. As shown in FIGS. 3 and 13, the motor unit 10 also includes control electronics 42 which include a controller 46, among other components, that are electrically connected to the motor 36.

Figure 4:
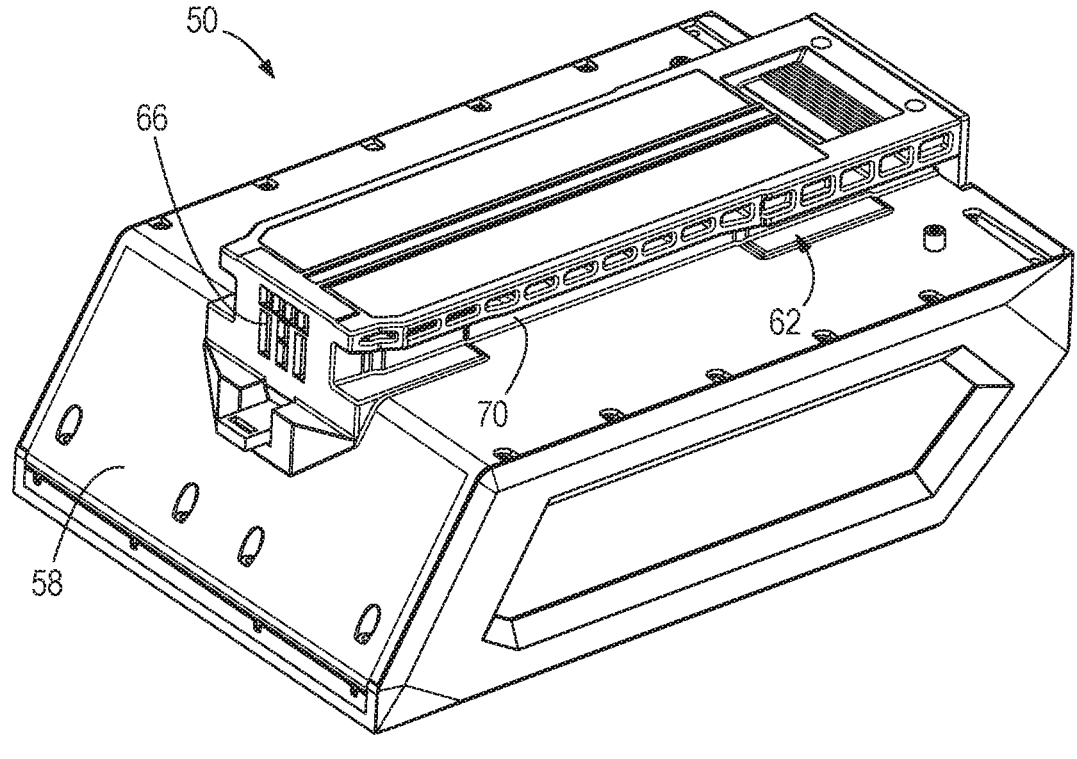
FIG. 4 is a perspective view of a battery pack of the stand-alone motor unit of FIG. 1.
Figure 5:
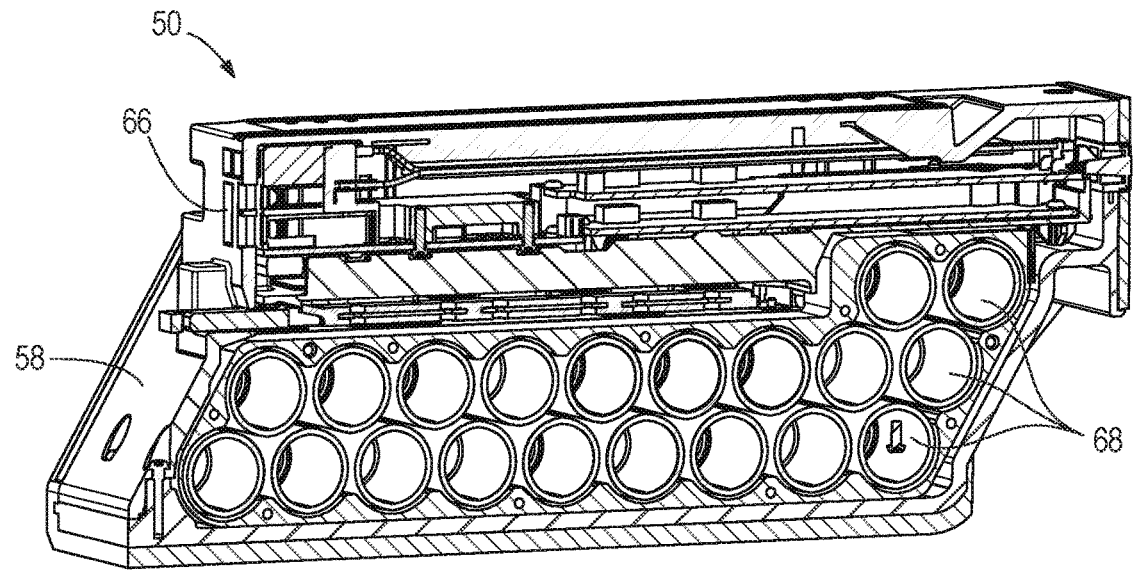
FIG. 5 is a cross-sectional view of the battery pack of FIG. 4.
Figure 6:
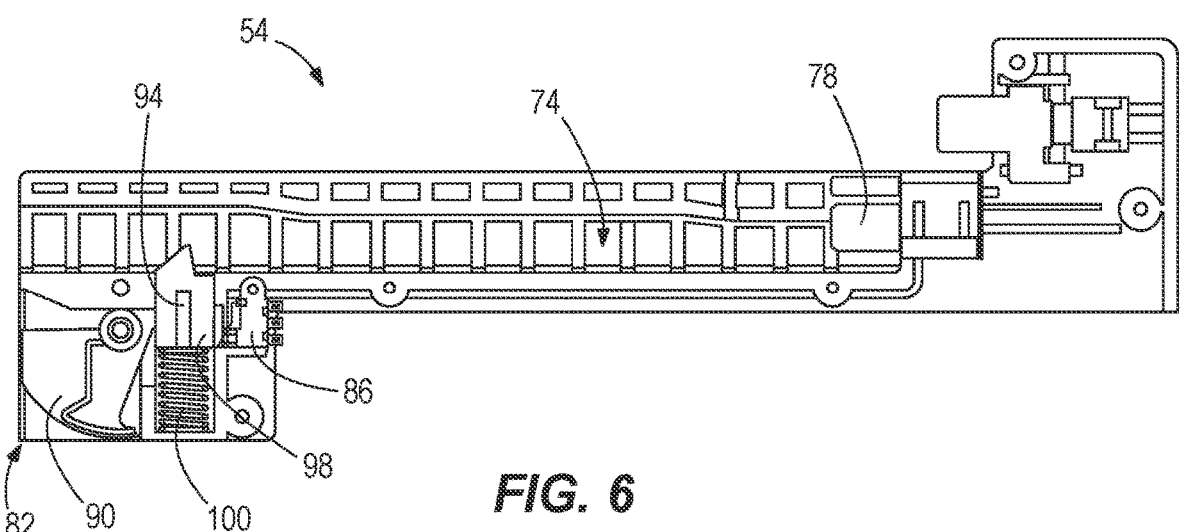
FIG. 6 is a cross-sectional view of a battery receptacle of the stand-alone motor unit of FIG. 1.

As shown in FIGS. 1-6, the motor unit 10 also includes a battery pack 50 that is removably received in a battery receptacle 54 in the housing 14 to transfer current from the battery pack 50 to the motor 36 via the control electronics 42. With reference to FIGS. 4-6, the battery pack 50 includes a battery pack housing 58 with a support portion 62 and a first terminal 66 that is electrically connected to a plurality of battery cells 68 supported by the pack housing 58. The support portion 62 provides a slide-on arrangement with a projection/recess portion 70 cooperating with a complementary projection/recess portion 74 (shown in FIG. 6) of the battery receptacle 54. In the embodiment illustrated in FIGS. 4-6, the projection/recess portion 70 of the battery pack 50 is a guide rail and the projection/recess portion 74 of the battery receptacle 54 is a guide recess. A similar battery pack is described and illustrated in U.S. patent application Ser. No. 16/025,491 filed Jul. 2, 2018, the entire content of which is incorporated herein by reference. In some embodiments, the battery cells 68 have a nominal voltage of up to about 80 V. In some embodiments, the battery cells 68 have a nominal voltage of up to about 120 V. In some embodiments, the battery pack 50 has a weight of up to about 6 lb. In some embodiments, each of the battery cells 68 has a diameter of up to 21 mm and a length of up to about 71 mm. In some embodiments, the battery pack 50 includes up to twenty battery cells 68. In some embodiments, the battery cells 68 are connected in series. In some embodiments, the battery cells 68 are operable to output a sustained operating discharge current of between about 40 A and about 60 A. In some embodiments, each of the battery cells 68 has a capacity of between about 3.0 Ah and about 5.0 Ah.

FIG. 6 illustrates the battery receptacle 54 of the motor unit 10 in accordance with some embodiments. The battery receptacle 54 includes the projection/recess portion 74, a second terminal 78, a latching mechanism 82, and a power disconnect switch 86. The projection/recess portion 74 cooperates with the projection/recess portion 70 of the battery pack 50 to attach the battery pack 50 to the battery receptacle 54 of the motor unit 10. When the battery pack 50 is attached to the motor unit 10, the second terminal 78 and the first terminal 66 are electrically connected to each other. The latching mechanism 82 protrudes from a surface of the battery receptacle 54 and is configured to engage the battery pack 50 to maintain engagement between the battery pack 50 and the battery receptacle 54. Thus, the battery pack 50 is connectable to and supportable by the battery receptacle 54 such that the battery pack 50 is supportable by the housing 14 of the stand-alone motor unit 10. In some embodiments, the battery pack receptacle 54 is arranged on the housing 14 in a position to create a maximum possible distance of separation between the motor 36 and the battery pack 50, in order to inhibit vibration transferred from the motor 36 to the battery pack 50. In some embodiments, elastomeric members are positioned on the battery pack receptacle 54 in order to inhibit vibration transferred from the motor 36, via the housing 14, to the battery pack 50.

In other embodiments (not shown), the latching mechanism 82 may be disposed at various locations (e.g., on a sidewall, an end wall, an upper end wall etc., of the battery receptacle 54) such that the latching mechanism 82 engages corresponding structure on the battery pack 50 to maintain engagement between the battery pack 50 and the battery receptacle 54. The latching mechanism 82 includes a pivotable actuator or handle 90 operatively engaging a latch member 94. The latch member 94 is slidably disposed in a bore 98 of the battery receptacle 54 and is biased toward a latching position by a biasing member 100 (e.g., a spring) to protrude through a surface of the battery receptacle 54 and into a cavity in the battery pack 50.

The latching mechanism 82 also includes the power disconnect switch 86 (e.g., a micro-switch) facilitating electrical connecting/disconnecting the battery pack 50 from the battery receptacle 54 during actuation of the handle 90 to withdraw the latch member 94 from the battery pack 50. The power disconnect switch 86 may act to electrically disconnect the battery pack 50 from the motor unit 10 prior to removal of the battery pack 50 from the battery receptacle 54. The power disconnect switch 86 is actuated when the latch member 94 is moved from the latched position (i.e., when the latch member 94 is completely within the cavity of the battery pack 50) to an intermediate position. The power disconnect switch 86 is electrically connected to the controller 46 and may generate an interrupt to indicate that the battery pack 50 is being disconnected from the motor unit 10. When the controller 46 receives the interrupt, the controller 46 begins a power down operation to safely power down the control electronics 42 of the motor unit 10. A similar latching mechanism and disconnect switch is described and illustrated in U.S. patent application Ser. No. 16/025,491, the entire content of which is incorporated herein by reference.

Figure 7:
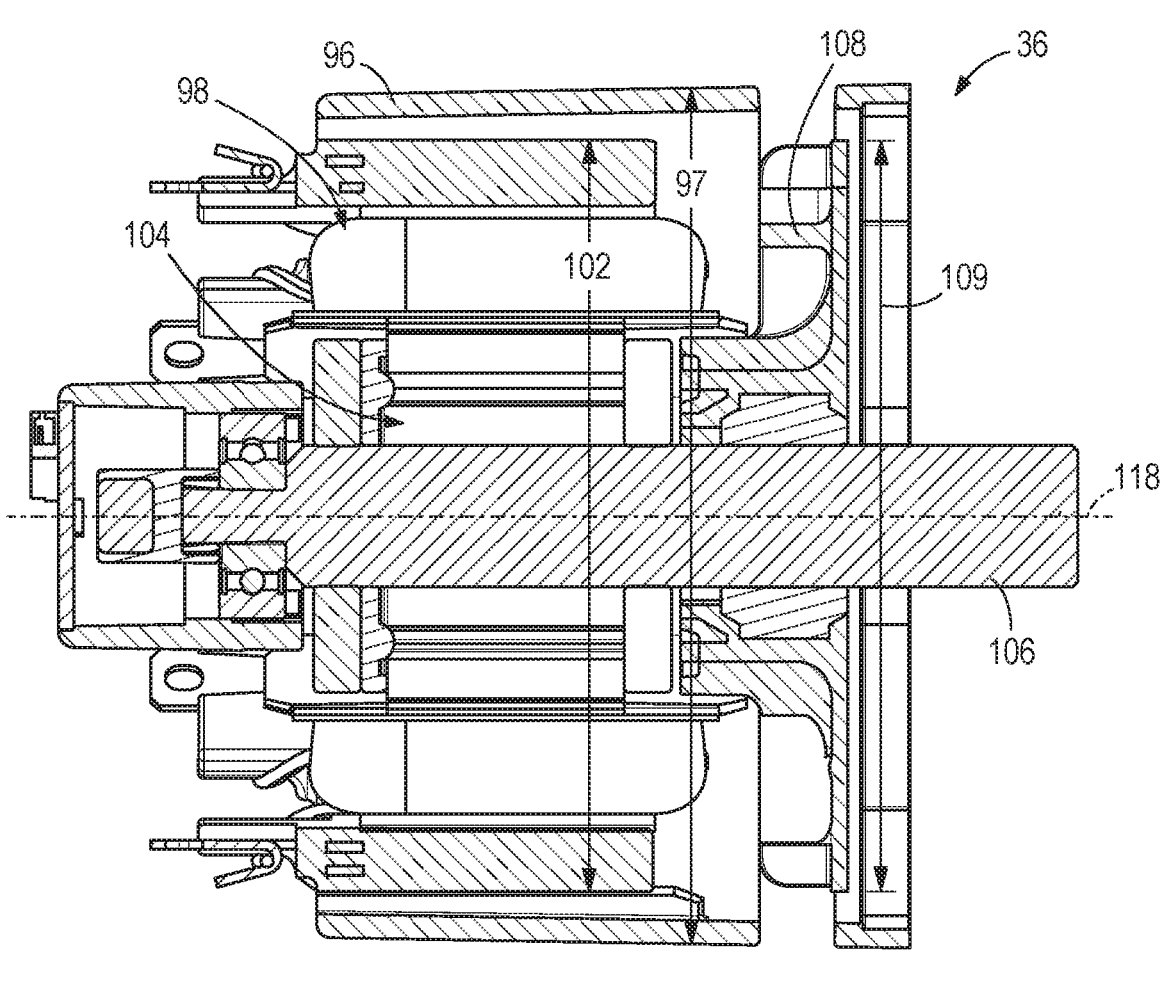
FIG. 7 is a cross-sectional view of a motor of the stand-alone motor unit of FIG. 1.
Figure 8:
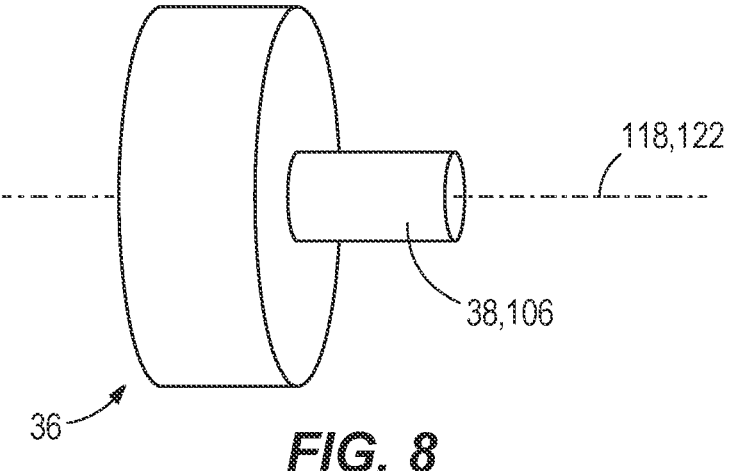
FIG. 8 is a schematic view of a motor of the stand-alone motor unit of FIG. 1.
Figure 12:
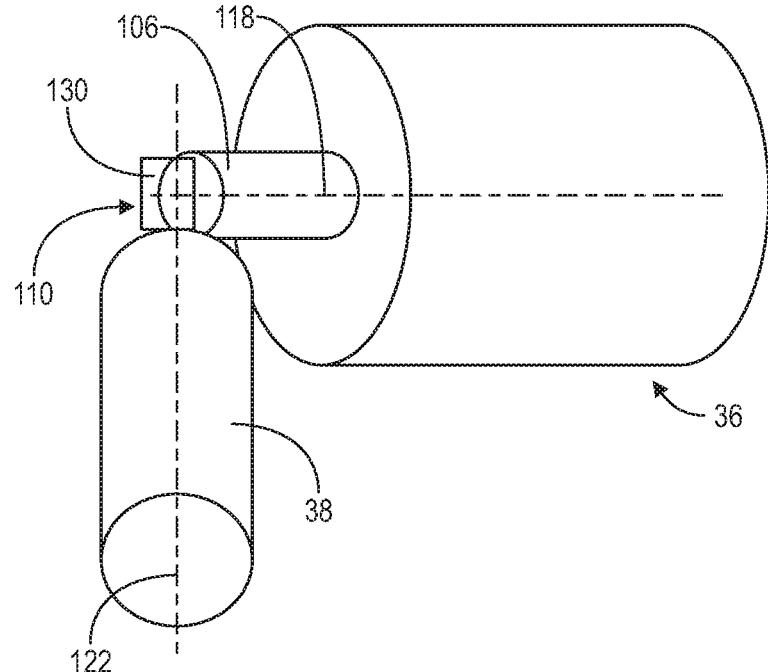
FIG. 12 is a schematic view of a motor, a gear train, and a power take-off shaft of the stand-alone motor unit of FIG. 1 in a third configuration.

As shown in FIG. 7, the motor 36 includes a motor housing 96 having an outer diameter 97, a stator 99 having a nominal outer diameter 102 of up to about 80 mm in some embodiments (or up to about 120 mm or larger in other embodiments), a rotor 104 having an output shaft 106 and supported for rotation within the stator 99, and a fan 108. A similar motor is described and illustrated in U.S. patent application Ser. No. 16/025,491, the entire content of which is incorporated herein by reference. In some embodiments, the motor 36 is a brushless direct current motor. In some embodiments, the motor 36 has a power output of at least about 2760 W. In some embodiments, the power output of the motor 36 may drop below 2760 W during operation. In some embodiments, the fan 108 has a diameter 109 that is larger than the diameter 97 of the motor housing 96. In some embodiments, the motor 36 can be stopped with an electronic clutch (not shown) for quick overload control. In some embodiments, the motor 36 has a volume of up to about 443,619 mm³. In some embodiments, the motor has a weight of up to about 4.6 lb. The housing 14 includes an inlet vent and an outlet vent, such that the motor fan 108 pulls air through the inlet vent and along the control electronics 42 to cool the control electronics 42, before the air is exhausted through the outlet vent. In the embodiment illustrated in FIG. 7, the motor is a 36 is an internal rotor motor, but in other embodiments, the motor 36 can be an outer rotor motor with a nominal outer diameter (i.e. the nominal outer diameter of the rotor) of up to about 80 mm.

With reference to FIGS. 8-12, the motor 36 can transfer torque to the power take-off shaft 38 in a variety of configurations. In the embodiment shown in FIG. 8, the output shaft 106 is also the power take-off shaft 38, such that the motor 36 directly drives the power take-off shaft 38 without any intermediate gear train. For example, the motor 36 may be a direct drive high pole count motor. As shown in FIG. 9, in other embodiments, the motor unit 10 includes a gear train 110 that transfers torque from the motor 36 to the power take-off shaft 38. In some embodiments, the gear train 110 can include a mechanical clutch (not shown) to discontinue the transfer of torque from the motor 36 to the power take-off shaft 38. In the embodiment shown in FIG. 10, the gear train 110 includes a planetary transmission 114 that transfers torque from the output shaft 106 to the power take-off shaft 38, and a rotational axis 118 of the output shaft 106 is coaxial with a rotational axis 122 of the power take-off shaft 38. In the embodiment shown in FIG. 11, the gear train 110 includes a spur gear 126 engaged with the output shaft 106 of the rotor, such that the rotational axis 118 of the output shaft 106 is parallel with the rotational axis 122 of the power take-off shaft 38. In the embodiment shown in FIG. 12, the gear train 110 includes a bevel gear 130, such that the rotational axis 118 of the output shaft 106 is perpendicular to the rotational axis 122 of the power take-off shaft 38. Thus, in the embodiment of FIG. 12, the rotational axis 118 of the output shaft 106 intersects the gear case 20 and the power take-off shaft 38 protrudes from the flange 34. In other embodiments utilizing a bevel gear, the rotational axis 118 of the output shaft 106 is not perpendicular, parallel, or coaxial to the rotational axis 122 of the power take-off shaft 38, and the power take-off shaft 38 protrudes from the flange 34.

With reference to FIGS. 14-21, the motor unit 10 can include a liquid cooling circuit 200 for removing heat from components of the motor unit 10 (e.g., the motor 36, the control electronics 42, the battery pack 50, etc.) during operation thereof. In the embodiment shown in FIG. 14, the liquid cooling circuit 200 includes a pump 204, a battery heat exchanger 206, an electronics heat exchanger 208, a motor heat exchanger 212, and a radiator 216, each fluidly connected within the liquid cooling circuit 200 by coolant lines 220. The battery heat exchanger 206 is coupled to the battery pack 50 (e.g., by interfacing with the battery receptacle 54), the electronics heat exchanger 208 is coupled to the control electronics 42, and the motor heat exchanger 212 is coupled to the motor 36. In operation, the pump 204 circulates a liquid phase working fluid through the battery heat exchanger 206, the electronics heat exchanger 208, the motor heat exchanger 212, and the radiator 216. As the working fluid passes through the heat exchangers 206, 208, 212, heat from the battery pack 50, the control electronics 42, and the motor 36 is transferred to the working fluid. The heated working fluid then passes through the radiator 216, where the heat acquired from the battery pack 50, the control electronics 42, and the motor 36 is transferred to the radiator 216 and then subsequently to the ambient air (via natural or forced convection), thereby cooling the working fluid. From the radiator 216, the cooled working fluid then returns to the heat exchangers 206, 208, 212, and the cycle is repeated. It is further contemplated that in other embodiments (not shown), one or more of the heat exchangers 206, 208, 212 may be omitted from the liquid cooling circuit 200 (while at least one of the heat exchangers 206, 208, 212 is retained), depending on parameters specific to the application (e.g., ambient air temperatures, etc.).

With reference to FIGS. 15-18, the pump 204 can be powered in several different ways, depending on the efficiency required, packaging constraints, and the drive power available, among other considerations. In the embodiment shown in FIG. 15, the pump 204 is located remote from both the motor 36 and the gear train 110, such that the pump 204 is not driven by the motor 36, either directly or indirectly (e.g., via the gear train 110). In this embodiment, the pump 204 can be driven by an auxiliary motor (not shown) powered by the battery pack 50.

Figure 16:
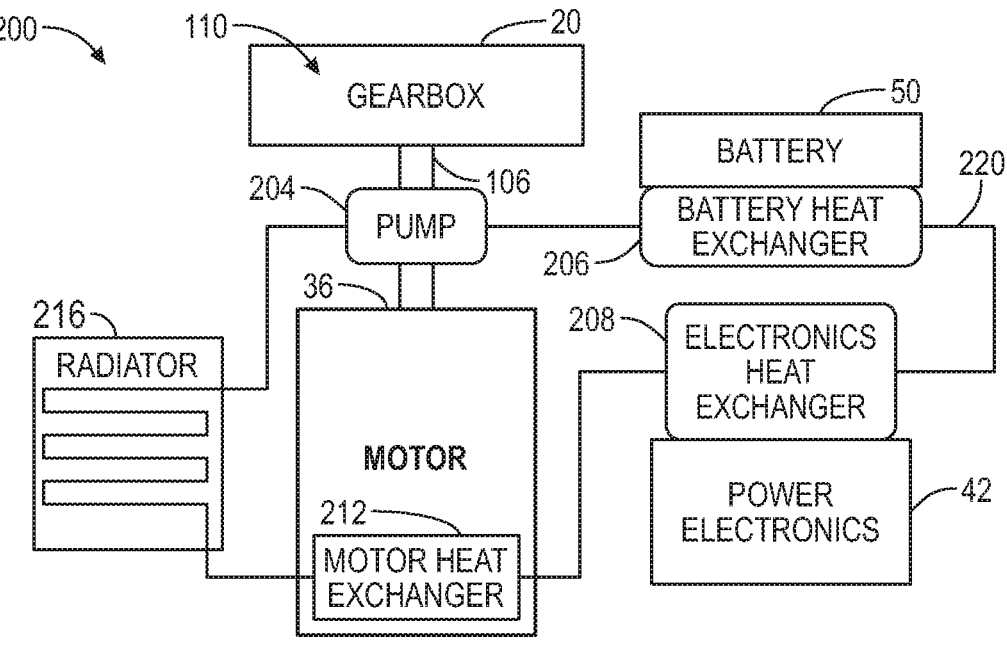
FIG. 16 is a schematic view of a liquid cooling circuit of the stand-alone motor unit of FIG. 1 in a second configuration.
Figure 17:
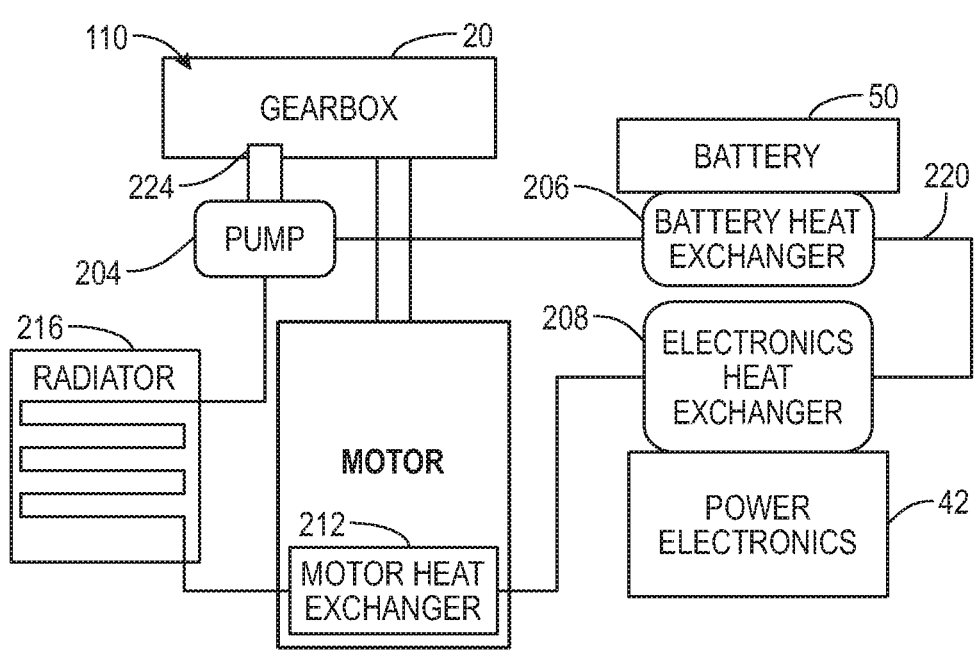
FIG. 17 is a schematic view of a liquid cooling circuit of the stand-alone motor unit of FIG. 1 in a third configuration.

As shown in FIGS. 16 and 17, in some embodiments, the pump 204 is driven with power from the motor 36. In the embodiment shown in FIG. 16, the pump 204 is driven directly by the output shaft 106 of the motor 36. In the embodiment shown in FIG. 17, the pump 204 is driven indirectly by the motor 36 via the gear train 110. Specifically, the gear train 110 drives an intermediate shaft 224, and the pump 204 is coupled to intermediate shaft 224. The intermediate shaft 224 can be driven by a gear reduction within the gear train 110, which may enable the use of a more efficient pump 204. In the embodiments shown in FIGS. 16 and 17, the working fluid is always circulating within the liquid cooling circuit 200 when the motor 36 is operating. When the motor 36 is deactivated, the pump 204 stops pumping, and the working fluid stops circulating within the liquid cooling circuit 200. These embodiments can eliminate the need for an auxiliary motor to drive the pump 204.

Figure 18:
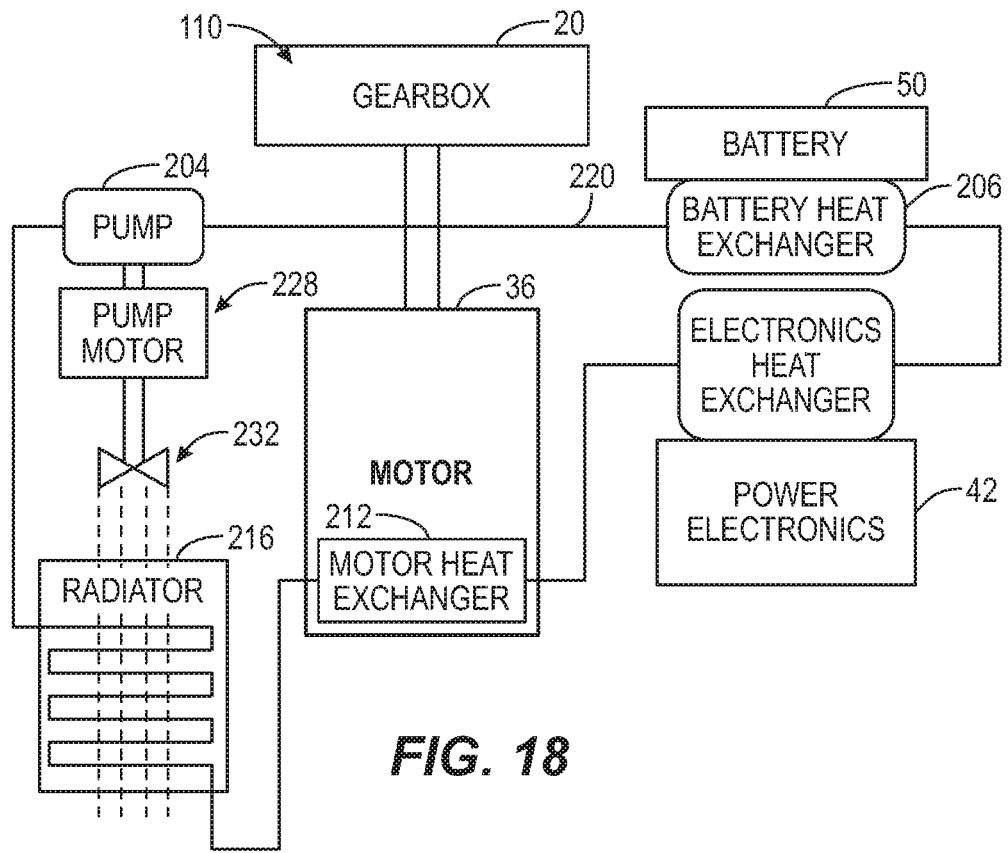
FIG. 18 is a schematic view of a liquid cooling circuit of the stand-alone motor unit of FIG. 1 in a fourth configuration.

With reference to FIG. 18, in another embodiment, the pump 204 is located remote from the motor 36 and the gear train 110, and instead coupled to an auxiliary motor 228. In addition to being coupled to the pump 204, the auxiliary motor 228 is also coupled to a radiator fan 232. In operation, the auxiliary motor 228 drives the pump 204 to circulate the working fluid within the liquid cooling circuit 200, and also rotates the radiator fan 232 to direct an airflow over the radiator 216. The airflow across the radiator 216 improves heat transfer between the working fluid and the ambient air. In the embodiments shown in FIGS. 15 and 18, the liquid cooling circuit 200 can be controlled to operate independently of the motor 36, including during periods when the motor 36 is deactivated. That is, the motor 36, the control electronics 42, and the battery pack 50 can be cooled when the motor 36 is not running. Or, the liquid cooling circuit 200 and the auxiliary motor 228 can be deactivated to save energy when cooling the motor 36, the control electronics 42, and the battery pack 50 is unnecessary. In addition, a rotating speed of the auxiliary motor 228 can be dynamically increased or reduced as desired to achieve a greater degree of control over the rate that the motor 36, the control electronics 42, and the battery pack 50 are cooled, which can allow for increased efficiency and longer run time. And, the liquid cooling circuit 200 can be independently controlled to optimize cooling (and reduce power consumption) based on ambient temperature. For example, in one application, the motor unit 10 could be utilized in a snow blower (not shown) typically used in the winter, while in another application, the motor unit 10 could be utilized in a lawn mower (not shown) typically used in the summer. The motor unit 10 utilized in the snow blower could require less cooling capacity than the motor unit 10 utilized in the lawn mower, due to the different ambient air conditions typically associated with operating snow blowers vs lawn mowers.

Figure 19:
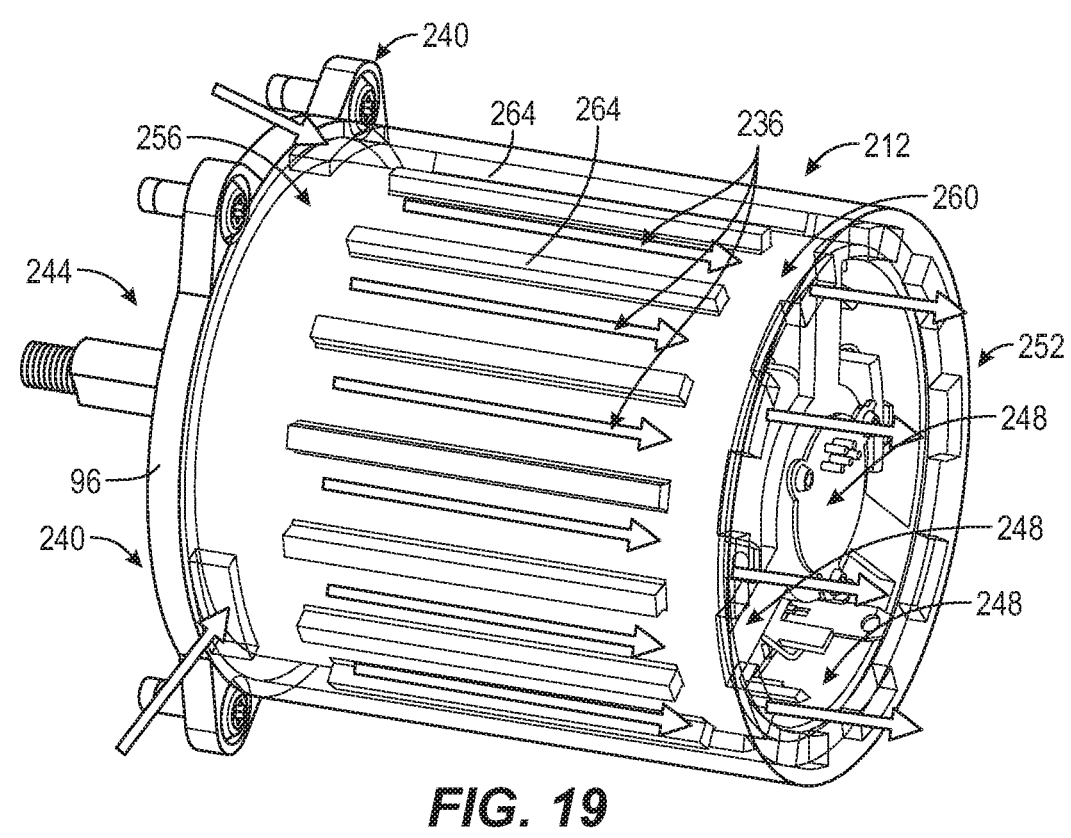
FIG. 19 is a perspective view of a motor heat exchanger of the stand-alone motor unit of FIG. 1, with portions removed.

With reference to FIG. 19, in one embodiment, the motor heat exchanger 212 can be formed as a portion of the motor housing 96 (FIG. 7), with the motor housing 96 defining axially-extending flow channels 236. In other embodiments, the motor heat exchanger 212 may be provided as a separate component from the motor housing 96. The motor heat exchanger 212 includes one or more inlets 240 located proximate a base 244 of the motor heat exchanger 212, and one or more outlets 248 located proximate an end 252 of the motor heat exchanger 212 opposite the base 244. In other embodiments (not shown), the locations of the inlets and outlets may be reversed such that the inlets 240 are located proximate the end 252 and the outlets are located proximate the base 244. In embodiments having two or more inlets 240 and two or more outlets 248, the motor heat exchanger 212 can further include an inlet manifold (not shown) for distributing the working fluid as it enters the multiple inlets 240, and an outlet manifold (not shown) for collecting the working fluid as it exits the multiple outlets 248. In the illustrated embodiment of FIG. 19, the motor heat exchanger 212 also includes an inlet plenum or inlet collection area 256, an outlet plenum or outlet collection area 260, and longitudinally-extending sidewalls 264 extending between the inlet and outlet collection areas 256, 260 and defining the flow channels 236 therebetween. In operation, the working fluid enters the motor heat exchanger 212 via the inlets 240, and initially collects within the inlet collection area 256. Then the working fluid flows through the flow channels 236 and absorbs heat from the motor 36. The heated working fluid then flows into the outlet collection area 260, and exits the motor heat exchanger 212 via the outlets 248.

Figure 20:
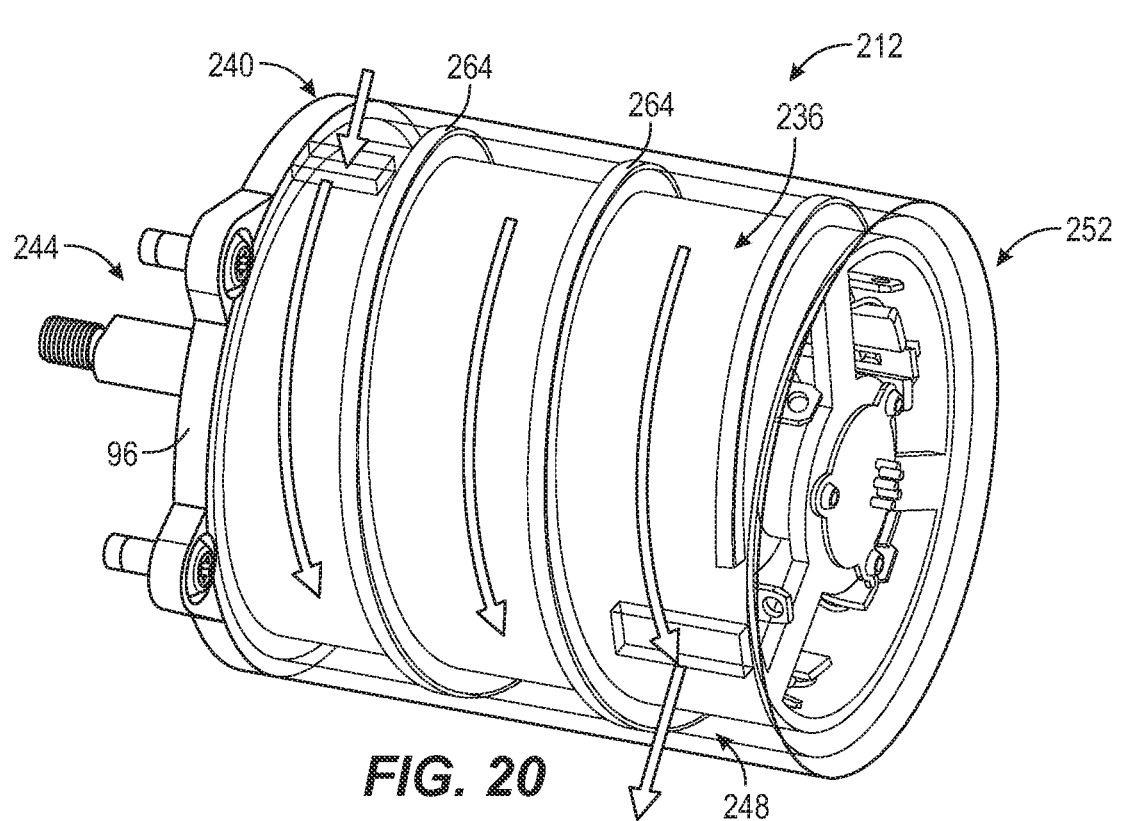
FIG. 20 is a perspective view of a motor heat exchanger of the stand-alone motor unit of FIG. 1 according to another embodiment, with portions removed.

With reference to FIG. 20, in another embodiment, the motor heat exchanger 212 can include helical flow channels 236*a* having both axial and circumferential components. In the embodiment shown in FIG. 20, the motor heat exchanger 212 includes a single helical flow channel 236*a* extending between the inlet 240 and the outlet 248. The helical flow channel 236*a* is defined between a helical sidewall 264*a* that extends between the base 244 and the end 252. In other embodiments, the motor heat exchanger 212 can include two or more parallel helical flow channels (not shown).

Figure 21:
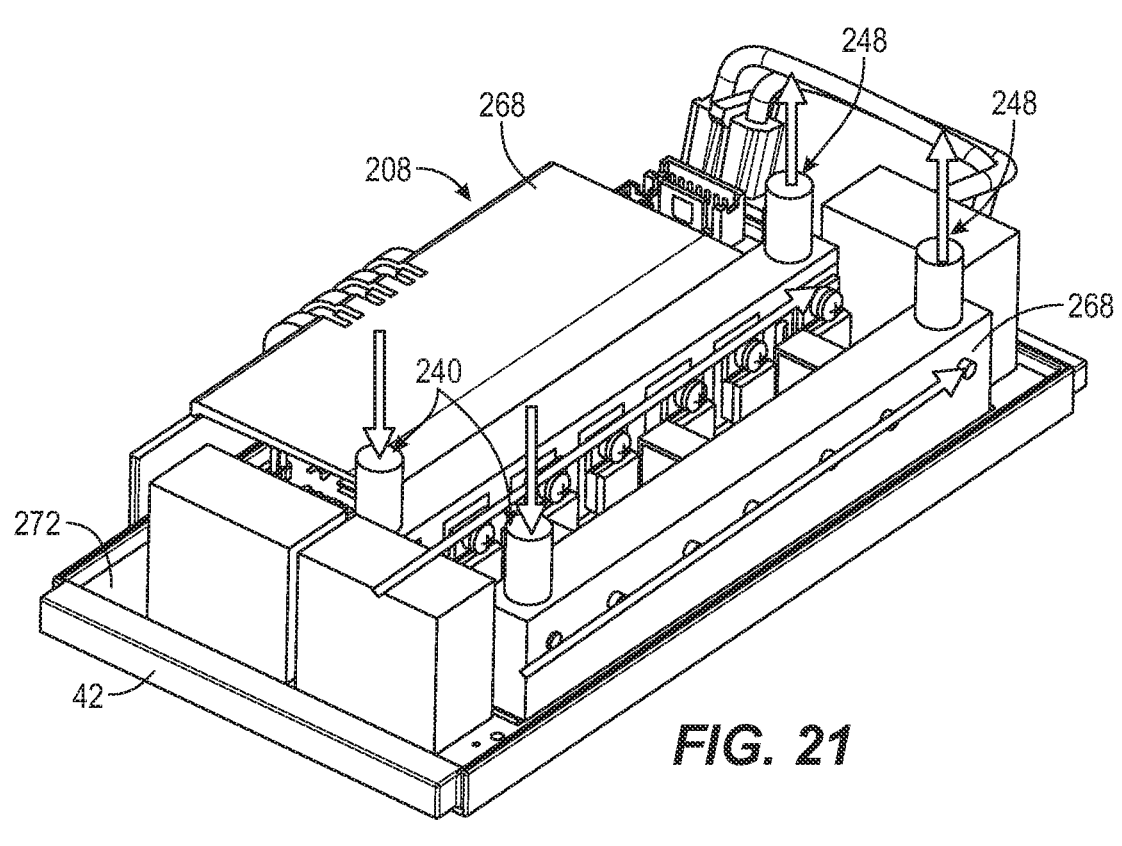
FIG. 21 is a perspective view of an electronics heat exchanger of the stand-alone motor unit of FIG. 1.

With reference to FIG. 21, the electronics heat exchanger 208 can include two or more heat exchanger units 268 each coupled to heat-generating electrical components (e.g., MOSFETs) supported on a circuit board 272 of the control electronics 42. In the embodiment of FIG. 21, each heat exchanger unit 268 includes an inlet 240 and an outlet 248. In some embodiments, the electronics heat exchanger 208 can further include an inlet manifold (not shown) for distributing the working fluid as it enters the multiple inlets 240, and an outlet manifold (not shown) for collecting the working fluid as it exits the multiple outlets 248.

In some embodiments, the liquid cooling circuit 200 described above can provide cooling for motor units 10 having an output power of about 3 kW. Or, in other embodiments, the liquid cooling circuit 200 can be implemented in larger systems (e.g., motor units 10 outputting about 8 kW). The liquid cooling circuit 200 can further eliminate the need for airflow through the housing 14, thus allowing the housing 14 to be sealed (i.e., water tight and/or air tight) so as to prevent dust, water, or other contaminants from contacting the components of the motor unit 10 (e.g., the motor 36, the control electronics 42, etc.). In embodiments having a sealed housing 14, the radiator 216 can be supported on the motor unit 10 outside of the housing 14, so as to be in contact with the ambient air to permit waste heat to be rejected to the ambient air.

Figure 22:
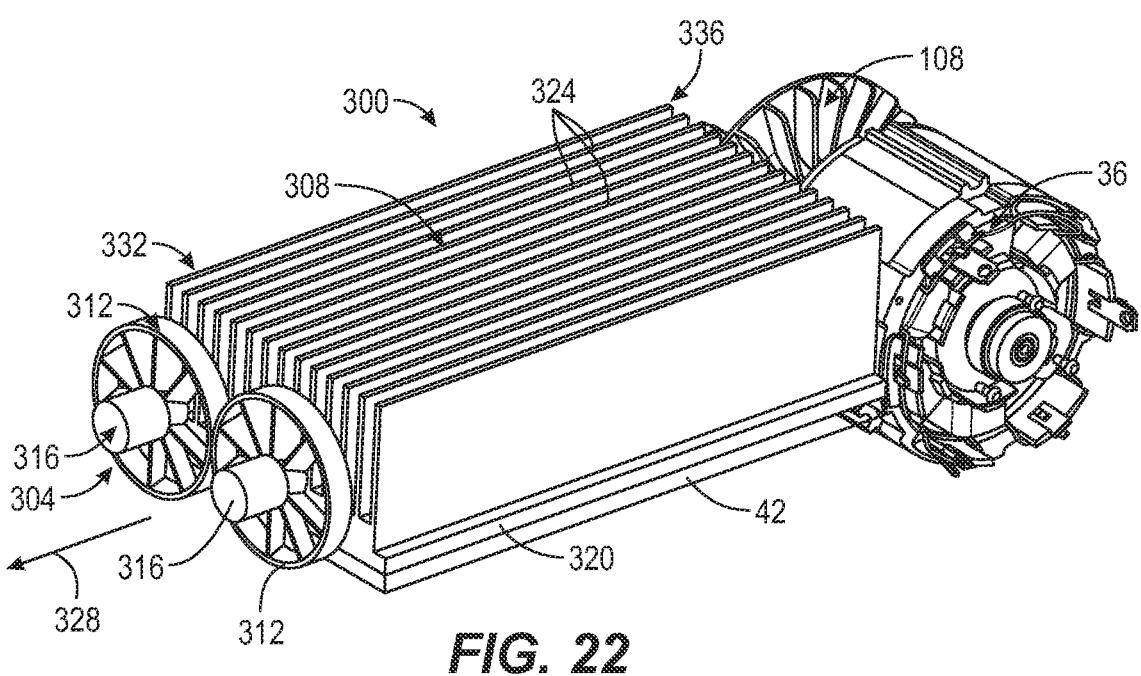
FIG. 22 is a schematic perspective view of an auxiliary cooling system of the stand-alone motor unit of FIG. 1 in a first configuration.
Figure 23:
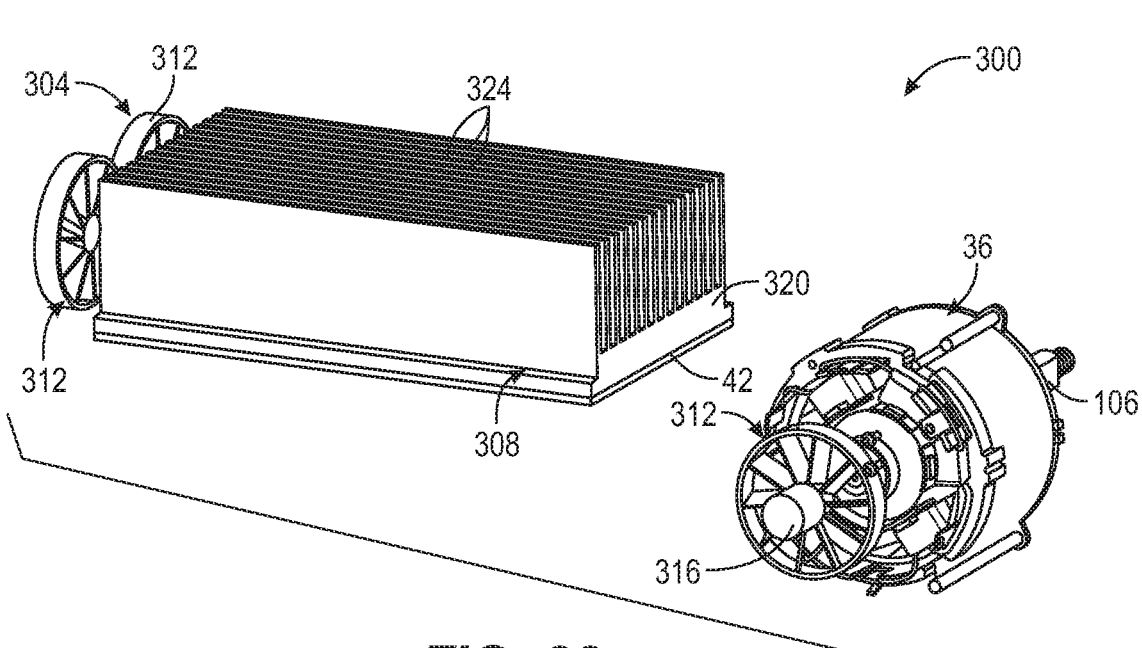
FIG. 23 is a schematic perspective view of an auxiliary cooling system of the stand-alone motor unit of FIG. 1 in a second configuration.

With reference to FIGS. 22 and 23 the motor unit 10 can include an auxiliary cooling system 300 for removing heat from components of the motor unit 10 (e.g., the motor 36, the control electronics 42, etc.) during operation thereof. The auxiliary cooling system 300 may be provided in lieu of, or in addition to, the liquid cooling circuit 200 described above. In the embodiment shown in FIG. 22, the auxiliary cooling system 300 includes an auxiliary fan module 304 and a heat sink 308 coupled to the control electronics 42. The auxiliary fan module 304 includes one or more auxiliary fans 312 powered by one or more auxiliary motors 316. In the embodiment shown in FIG. 22, the auxiliary fan module 304 includes two auxiliary fans 312, with each auxiliary fan 312 being coupled to a respective auxiliary motor 316. In other embodiments (not shown), the auxiliary fan module can include fewer or more than two auxiliary fans. And in further embodiments, two or more auxiliary fans can be driven by a single auxiliary motor (e.g., via a belt drive or other torque transmission assembly (not shown)). The heat sink 308 includes a baseplate 320 coupled to the control electronics 42, and longitudinally extending fins 324 protruding upward from the baseplate 320 for dissipating heat conducted from the control electronics 42 to the ambient air.

The auxiliary fan module 304, the heat sink 308, and the motor 36 can be aligned along an axis 328 as illustrated in FIG. 22. Specifically, the fan module 304, the heat sink 308, and the motor 36 can be arranged within the motor unit 10 with the auxiliary fan module 304 located adjacent a first longitudinal end 332 of the heat sink 308, and the motor 36 located adjacent a second longitudinal end 336 of the heat sink 308 opposite the first longitude end 332. When the auxiliary cooling system 300 and the motor 36 are arranged in this manner, an airflow generated by the auxiliary fan module 304 flows across the fins 324 and around the motor 36. Accordingly, the auxiliary fan module 304 can be operated to simultaneously cool the control electronics 42 and the motor 36. In other embodiments, the auxiliary cooling system 300 and the control electronics 42 associated therewith can be located remote from the motor 36. Such embodiments can allow greater flexibility in the configuration of the motor unit 10, and can also permit the motor 36 and the control electronics 42 to be separate by a barrier.

In operation, the auxiliary cooling system 300 can be controlled to operate independently of the motor 36, including during periods when the motor 36 is deactivated. That is, the motor 36 and the control electronics 42 can be cooled by the auxiliary cooling system 300 when the motor 36 is not running. Or, the auxiliary cooling system 300 can be deactivated to save energy when cooling the motor 36 and the control electronics 42 is unnecessary (e.g. during periods of light use of the motor unit 10). In addition, a rotating speed of the auxiliary motor(s) 316 can be dynamically increased or reduced as desired to achieve a greater degree of control over the rate that the motor 36 and the control electronics 42 are cooled, which can allow for increased efficiency and longer run time. The auxiliary cooling system 300 can also allow for a reduction in an airflow generated by the motor fan 108 (FIG. 7) of the motor 36, thus allowing for a reduction in a size of the fan 108, a size of the motor 36, and/or an amount of power drawn by the motor 36.

In the embodiment shown in FIG. 23, the auxiliary cooling system 300 includes the auxiliary fan module 304 and the heat sink 308, which are provided at a location remote from that of the motor 36. In this embodiment, the auxiliary cooling system 300 also includes an additional auxiliary fan 312 having an auxiliary motor 316, provided proximate the motor 36 to direct an airflow across the motor 36. Similar to the embodiment described above with respect to FIG. 22, the auxiliary cooling system 300 of FIG. 23 decreases an amount of power spent to cool the motor 36 and the control electronics 42, as compared to cooling systems relying only on the motor fan 108 coupled to the output shaft 106 of the motor 36 (e.g., by allowing the auxiliary motors 316 powering the auxiliary fan(s) 312 to be deactivated when cooling is not need, such as during periods of light use of the motor unit 10). In further embodiments (not shown), an additional auxiliary fan 312 can be provided proximate the battery pack 50 to direct air around the battery pack 50 as necessary.

Figure 24:
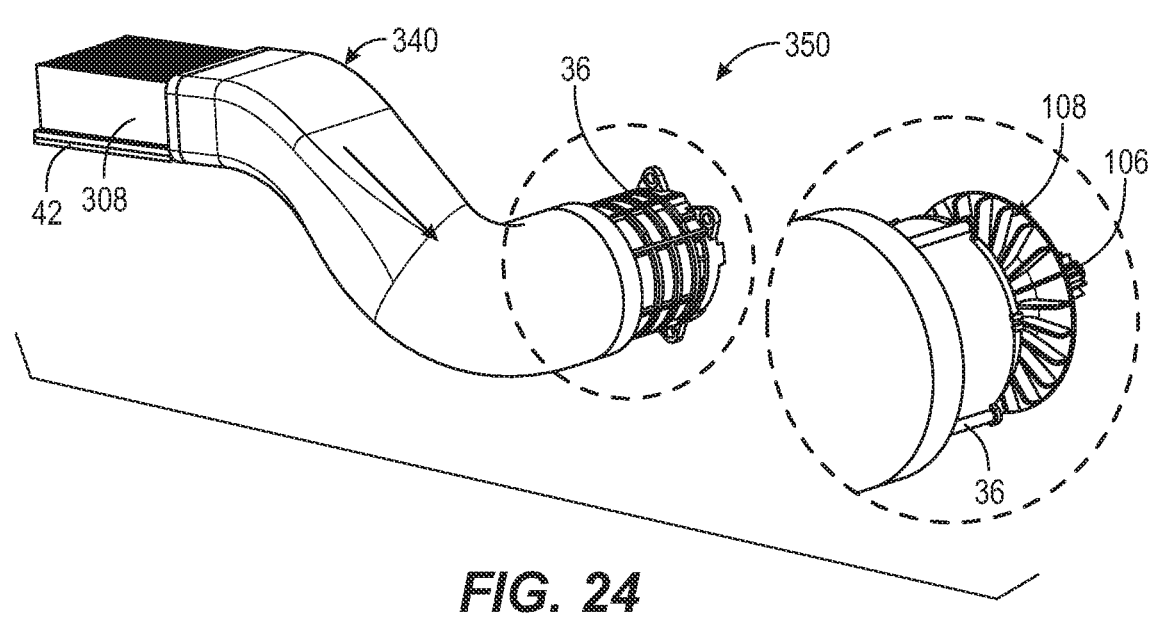
FIG. 24 is a schematic perspective view of an air cooling system of the stand-alone motor unit of FIG. 1 in a first configuration.
Figure 25:
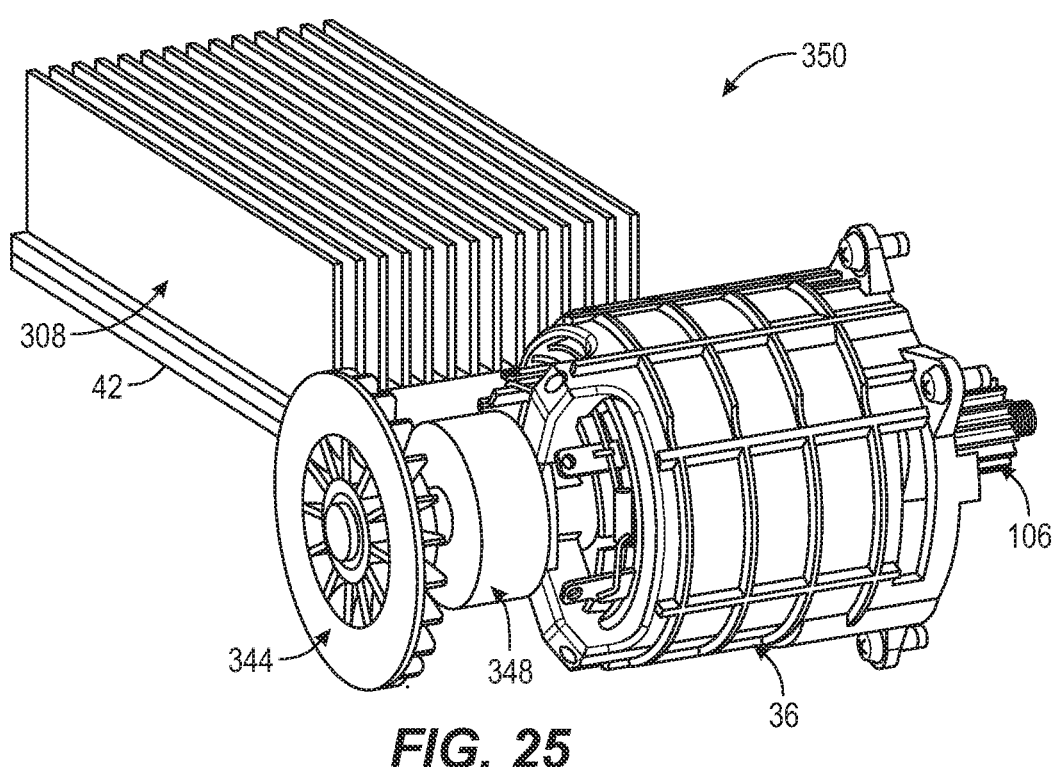
FIG. 25 is a schematic perspective view of an air cooling system of the stand-alone motor unit of FIG. 1 in a second configuration.

With reference to FIGS. 24 and 25, the motor unit 10 can also include air cooling system 350 for removing heat from components of the motor unit 10 (e.g., the motor 36, the control electronics 42, etc.) during operation thereof. In the embodiment shown in FIG. 24, when the motor 36 and the control electronics 42 are located remotely from one another, the air cooling system 350 can include the heat sink 308 and a duct 340 extending between the heat sink 308 and the motor 36, to direct an airflow from the heat sink 308 to the motor 36. In such embodiments, all of the airflow can be generated by the motor fan 108 coupled to the output shaft 106 of the motor 36. Or, in other embodiments (not shown), the air cooling system 350 can further include an auxiliary fan 312 located proximate the motor 36 to direct the airflow both across the motor 36 and through the duct 340 toward the heat sink 308.

In the embodiment shown in FIG. 25, the air cooling system 350 can include the heat sink 308 coupled to the control electronics 42, and a secondary fan 344 coupled to the output shaft 106 via a gearbox 348. The gearbox 348 can provide gear ratio adjustment between the output shaft 106 and the secondary fan 344, so that the secondary fan 344 can be optimized to rotate at a different speed than the output shaft 106. This arrangement of the air cooling system 350 can allow for more efficient cooling of the motor 36 and the control electronics 42, thus reducing a battery consumption of the motor unit 10.

With reference to FIGS. 26-29, the motor unit 10 can include a cooling system 400 for removing heat from components of the motor unit 10 (e.g., the motor 36, the control electronics 42, etc.) during operation thereof. The cooling system 400 may be provided in lieu of, or in addition to, the liquid cooling circuit 200, the auxiliary cooling system 300, and/or the air cooling system 350 described above.

Figure 26:
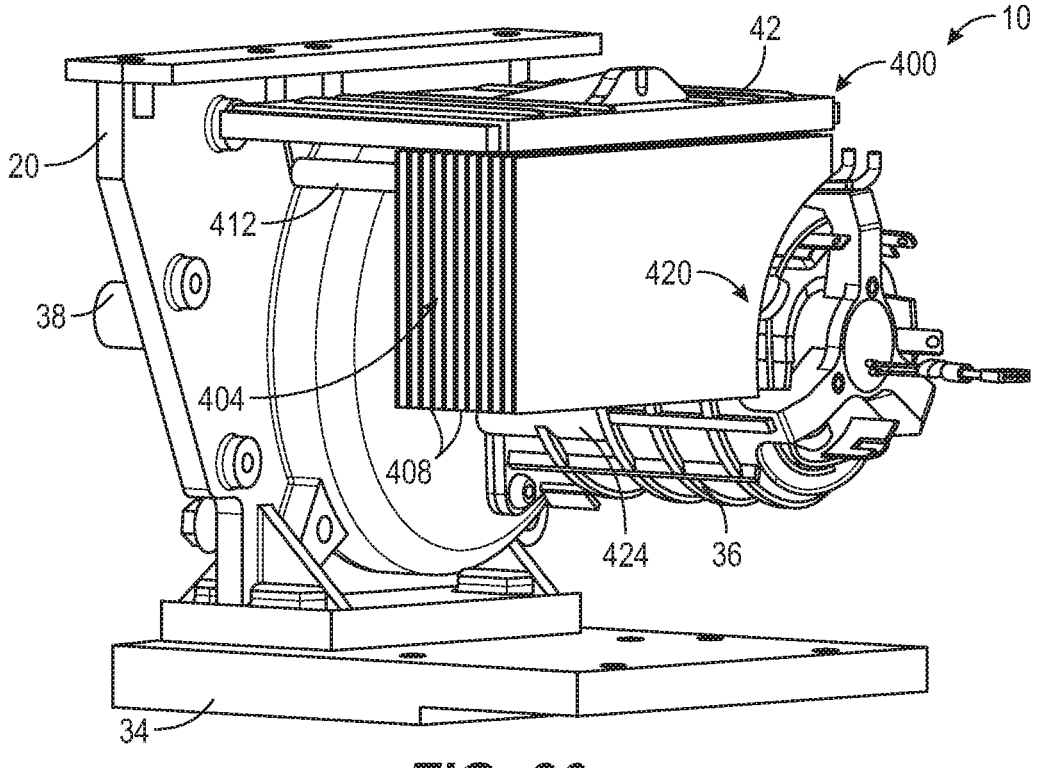
FIG. 26 is a schematic perspective view of a cooling system of the stand-alone motor unit of FIG. 1 in a first configuration.
Figure 27:
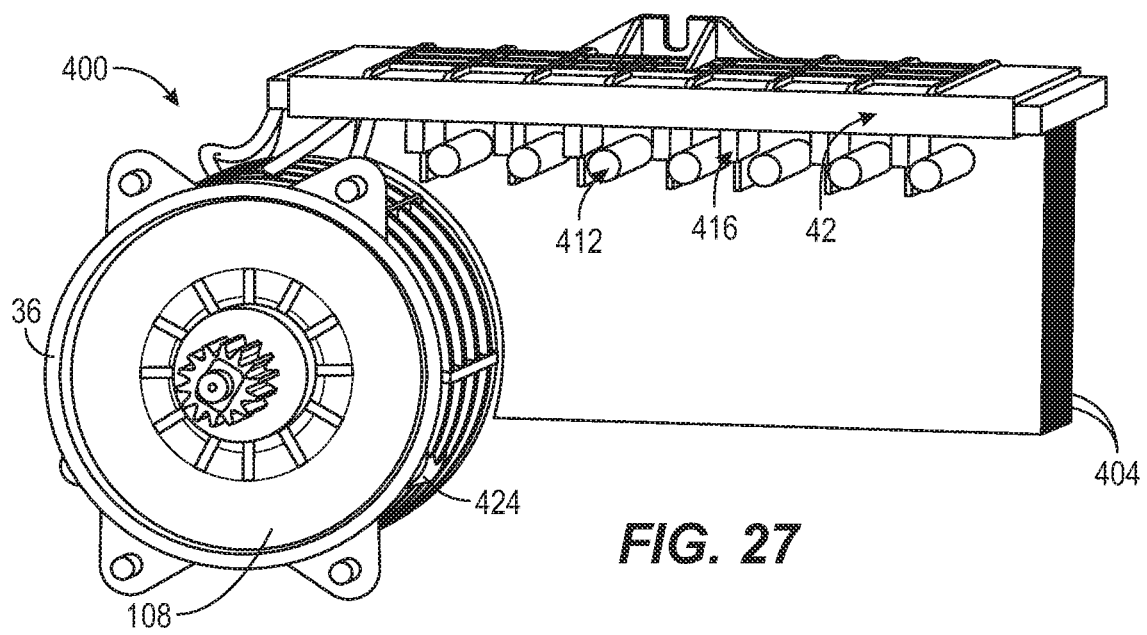
FIG. 27 is another schematic perspective view of the cooling system of FIG. 26.

In the embodiment shown in FIGS. 26 and 27, the cooling system 400 includes an evaporator 404 coupled to a two-phase cooling circuit (not shown). The evaporator 404 is coupled to the control electronics 42 to absorb heat therefrom. The motor 36 and the control electronics 42 are supported against the gear case 20, with the control electronics 42 located proximate the motor 36. The evaporator 404 includes fins 408 projecting away from the control electronics 42, and heat pipes 412 extending transversely to intersect the fins 408. The control electronics 42 include field effect transistors (FETs) 416 located adjacent the heat pipes 412 of the evaporator 404. The fins 408 extend generally transverse to the rotational axis 118 of the output shaft 106, with an end region 420 of the fins 408 located proximate a motor fan outlet 424 of the motor 36.

In operation, a two phase working fluid enters the heat pipes 412 of the evaporator 404 in liquid phase. The fins 408 of the evaporator 404 conduct heat away from the control electronics 42 (including the FETs 416), which is transferred to the liquid phase working fluid, causing the working fluid to evaporate to vapor phase. The vapor phase fluid then exits the heat pipes 412 toward a condenser (not shown), which then transfers heat to the ambient air and cools the working fluid back to a liquid phase. Meanwhile, the motor fan 108 (FIG. 7) directs an airflow from the fan outlet 424. The airflow exiting the fan outlet 424 blows across the fins 408. In some embodiments, the airflow exits the fan outlet 424 at a temperature lower than that of the control electronics 42 and the working fluid in the heat pipes 412, such that the airflow passively cools the control electronics 42. In other embodiments, the airflow can exit the fan outlet 424 at a temperature higher than that of the working fluid in the heat pipes 412, such that the evaporator 404 indirectly or passively cools the motor 36 by accepting heat from the exiting airflow.

In further embodiments, (not shown), the heat pipes 412 can be extended to the motor 36, to cool the motor 36 in addition to the control electronics 42. In such embodiments, the motor fan 108 may be eliminated. In other embodiments, the heat pipes 412 themselves could be independent, enclosed systems having integral evaporator and condenser components and functionality. That is, the heat pipes 412 could include separate, enclosed respective evaporator and condenser regions, with a two phase working fluid migrating internally between the regions to transfer heat therebetween. In such embodiments, the fins 408 may be coupled to the evaporator region and to the control electronics 42 to conduct heat away from the control electronics 42 (including the FETs 416), which is transferred to the liquid phase working fluid, causing the working fluid within the evaporator region to evaporate to vapor phase. The vapor phase fluid then migrates along the pipes 412 toward the condenser region, which then transfers heat to the ambient air and cools the working fluid back to a liquid phase.

Figure 28:
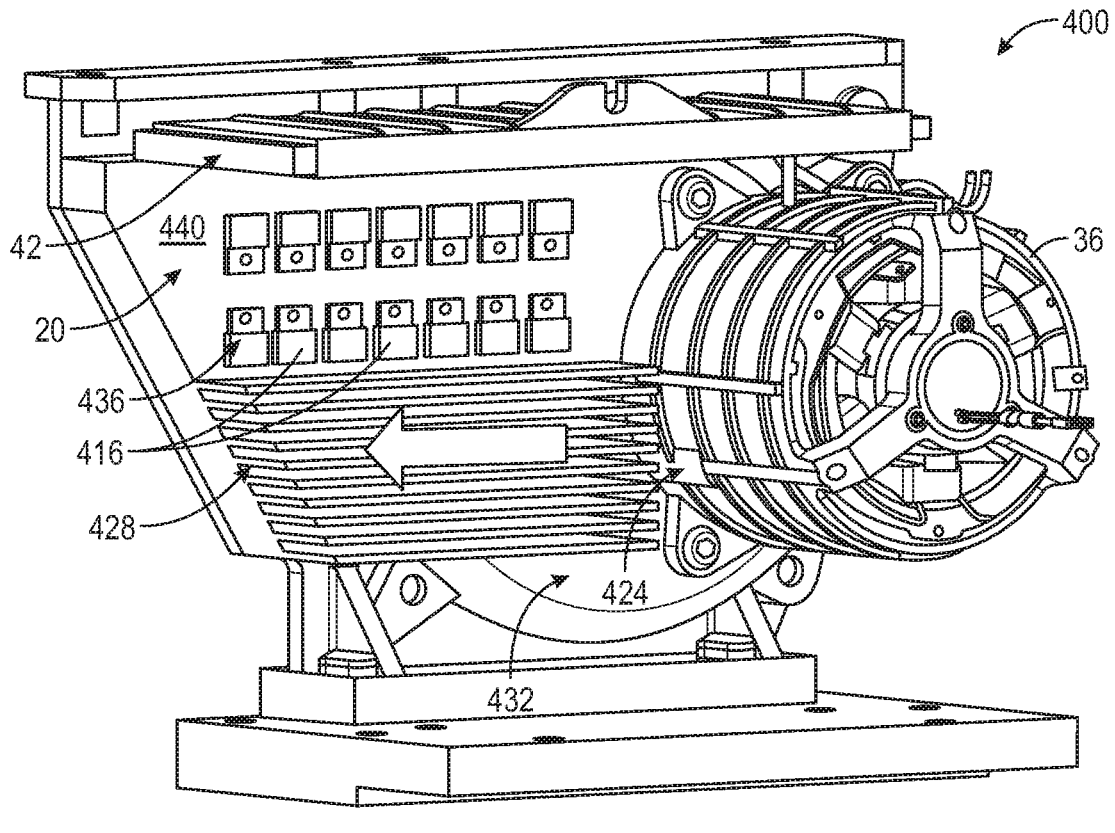
FIG. 28 is a schematic perspective view of a cooling system of the stand-alone motor unit of FIG. 1 in a second configuration.

In the embodiment shown in FIG. 28, the passive cooling system 400 can include the gear case 20, and fins 428 protruding away from the gear case 20 and adjacent the motor 36. The fins 428 extend generally transverse to the rotational axis 118 of the output shaft 106, with an end region 432 of the fins 428 located proximate the motor fan outlet 424 of the motor 36. The motor 36 and the control electronics 42 are supported against the gear case 20, with the control electronics 42 located proximate the motor 36. However, some critical, heat generating electronic components 436 (e.g., the FETs 416) are supported directly against a first surface 440 of the gear case 20, adjacent the fins 428, with the first surface 440 located in fluid communication with an airflow exiting the fan outlet 424 of the motor 36. During operation of the motor unit 10, the gear case 20 conducts heat away from the heat generating electronic components 436 supported thereon. Some of the heat is conducted to the fins 428, and dissipated by the airflow exiting the fan outlet 424 and blowing across the fins 428. In addition, some of the airflow also passes across the first surface 440 to carry away heat from the gear case 20 and from the heat generating electronic components 436. Moreover, at least some of the heat generated by the heat generating electronic components 436 can be conducted generally to other regions of the gear case 20, and dissipated to the ambient air by subsequent heat transfer processes (e.g., convection and radiation). In the embodiment shown in FIG. 28, the arrangement of the fins 428 and the heat generating electronic components 436 against the gear case 20 can allow a less restricted airflow exiting the fan outlet 424 as compared to a more traditional method of using heat sinks mounted to the control electronics 42 and placed inside a plastic housing. The cooling system 400 of FIG. 28 could permit the motor fan 108 (FIG. 7) to be downsized, saving energy and increasing runtime of the motor unit 10. In other embodiments, the direction of the motor fan 108 can be effectively reversed, so that the airflow instead enters via the fan outlet 424 (rendering the fan outlet 424 an "inlet"). In such embodiments, the airflow is instead drawn across the fins 428 and into the fan outlet 424, and then expelled out an end of the motor 36.

Figure 29:
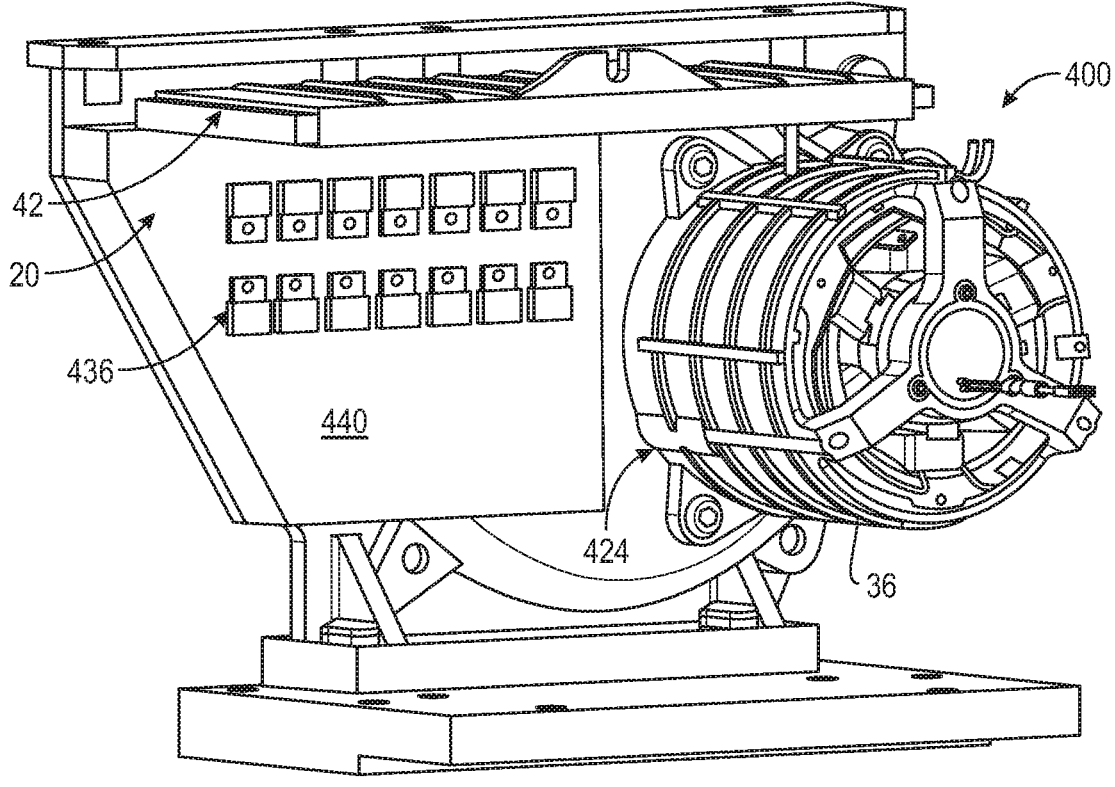
FIG. 29 is a schematic perspective view of a cooling system of the stand-alone motor unit of FIG. 1 in a third configuration.

In the embodiment shown in FIG. 29, the cooling system 400 is arranged in a manner similar to that discussed above with regard to FIG. 28, except that there are no fins protruding from the gear case 20. The heat generating electronic components 436 are still supported on the first surface 440 of the gear case 20, proximate the fan outlet 424 of the motor 36. During operation of the motor unit 10, the airflow exiting the fan outlet 424 passes across the first surface 440 to carry away heat from the gear case 20 and from the heat generating electronic components 436. Moreover, at least some of the heat generated by the heat generating electronic components 436 can be conducted generally to other regions of the gear case 20, and dissipated to the ambient air by subsequent heat transfer processes (e.g., convection and radiation). By removing the fins 428, the airflow exiting the fan outlet 424 encounters less resistance as it flows across the first surface 440. Accordingly, the arrangement of the cooling system 400 shown in FIG. 29 can allow the motor fan 108 to be further downsized or eliminated, saving energy and increasing the runtime of the motor unit 10.

Figures 30, 31:
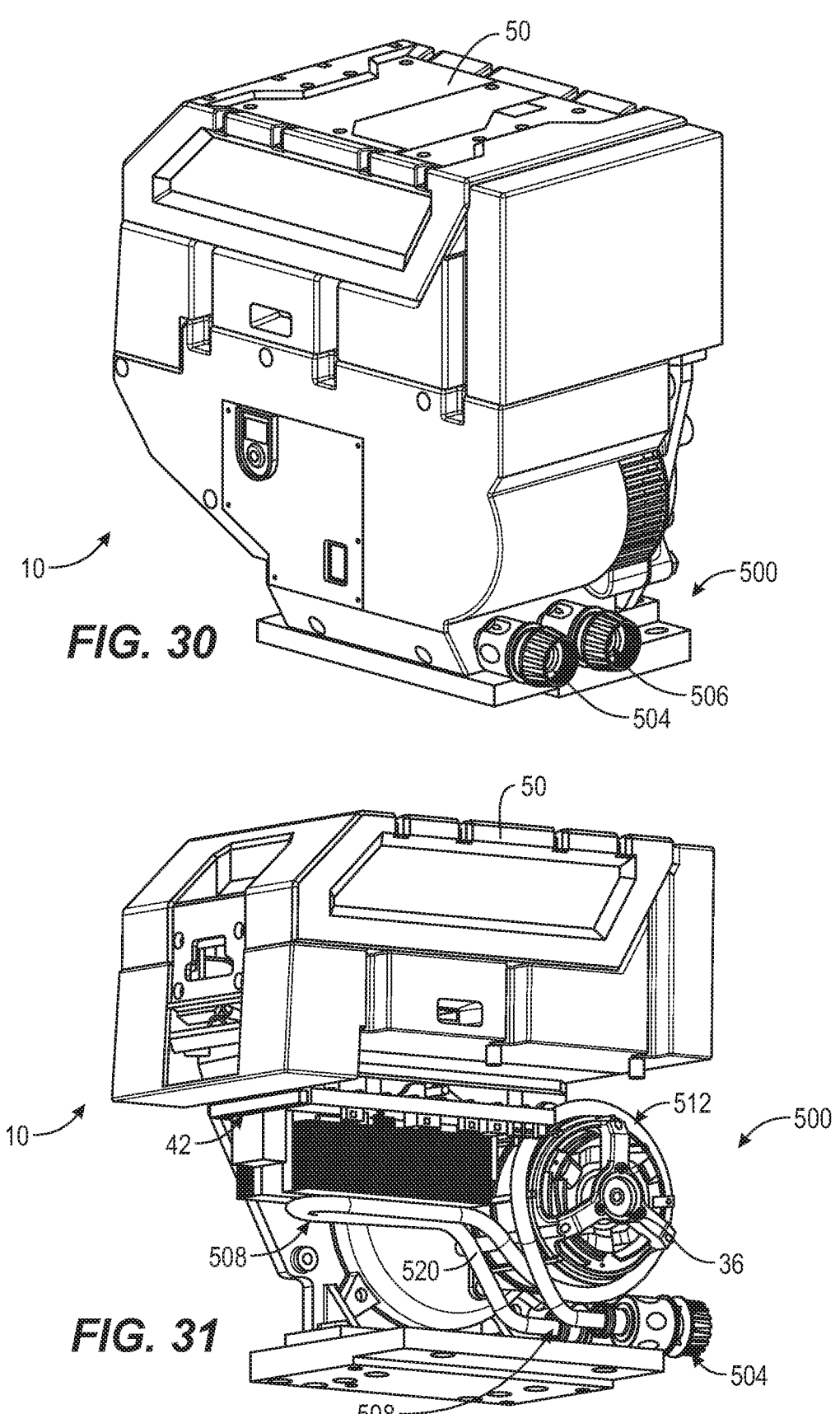
FIG. 30 is a perspective view of the stand-alone motor unit of FIG. 1 including a liquid cooling circuit.
FIG. 31 is another perspective view of the stand stand-alone motor unit of FIG. 1 including a liquid cooling circuit, with portions removed.

With reference to FIGS. 30 and 31, the motor unit 10 can include a liquid cooling subassembly 500 for removing heat from components of the motor unit 10 (e.g., the motor 36, the control electronics 42, the battery pack 50, etc.) during operation thereof. In the embodiment shown in FIG. 31, the liquid cooling subassembly 500 includes a supply connector 504, a return connector 506, an electronics heat exchanger 508, and a motor heat exchanger 512, each fluidly connected within the liquid cooling subassembly 500 by coolant lines 520. The electronics heat exchanger 508 is coupled to the control electronics 42, and the motor heat exchanger 512 is coupled to the motor 36. In other embodiments (not shown), the liquid cooling subassembly 500 may further include a battery heat exchanger coupled to the battery pack 50 (e.g., by interfacing with the battery receptacle 54).

The liquid cooling subassembly 500 receives liquid coolant (e.g., water) from an external source (not shown) via the supply connector 504. The liquid coolant flows through the liquid cooling subassembly 500, including the electronics heat exchanger 508 and the motor heat exchanger 512, to cool the associated components of the motor unit 10 (e.g., the motor 36, the control electronics 42, etc.). Then the liquid coolant exits the liquid cooling subassembly 500 via the return connector 506. The supply and return connectors 504, 506 can be threaded connectors (e.g., garden hose threads (GHT) connectors, etc.) for threadably connecting to hoses (not shown) for supplying and returning the liquid coolant.

The external source of liquid coolant can include a water source associated with a piece of power equipment (not shown) used in connection with the motor unit 10. For example, the power equipment can include trash or water pumps (not shown) that move water through hoses near the motor unit 10. Similarly, the power equipment can include a plate compactor having an on-board water tank for wetting soil before compaction. In other applications, the power equipment can include a concrete saw that supplies water to the blade and cutting area to minimize dust. By utilizing the water sources associated with such power equipment to supply water to the liquid cooling subassembly 500, the motor unit 10 can be cooled without drawing additional power from the motor unit 10, thus extending runtime.

With reference to FIGS. 32-41, the motor unit 10 can include an air filtering system 600 for filtering the cooling air drawn into the motor unit 10 during operation. The filtering system 600 prevents debris such as dirt, rock dust, excess moisture, particulates, or other abrasive material from entering with the cooling air and depositing on the motor 36, the control electronics 42, or other cooled components (e.g., battery pack 50).

Figure 32:
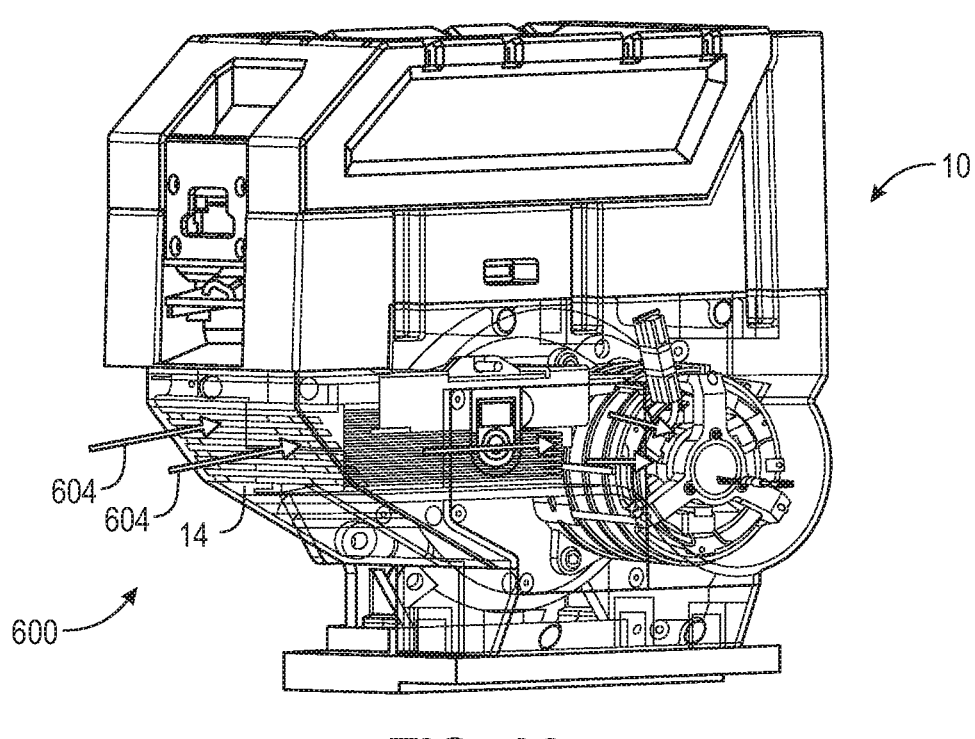
FIG. 32 is a perspective view of the stand-alone motor unit of FIG. 1.
Figure 33:
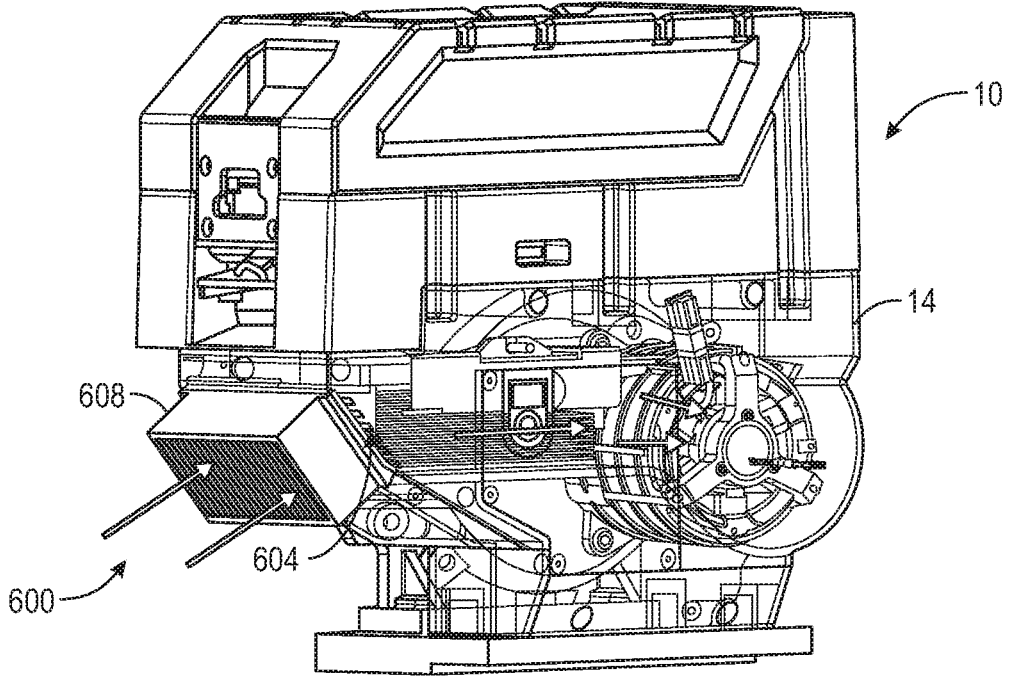
FIG. 33 is a perspective view of the stand-alone motor unit of FIG. 1 including an air filtering system in a first configuration.

In the embodiment shown in FIG. 32, the motor unit 10 includes vents 604 formed in the housing 14. During operation of the motor unit 10, the fan 108 (FIG. 7) draws cooling air through the vents 604 and into the housing 14. With reference to FIG. 33, in one embodiment, the air filtering system 600 can include a removable and replaceable filter 608 positioned over the vents 604 to remove debris and particulates from the cooling air entering into the housing 14. The filter 608 can be attached to the housing 14 (e.g., by fasteners, clips, latches, or other suitable means) to cover the vents 604. Since the filter 608 is removable and replaceable, the user can decide whether to install the filter 608 when operating the motor unit 10, depending on environmental conditions at the use location (e.g., whether the environment contains airborne debris and/or particulates, etc.).

Figure 34:
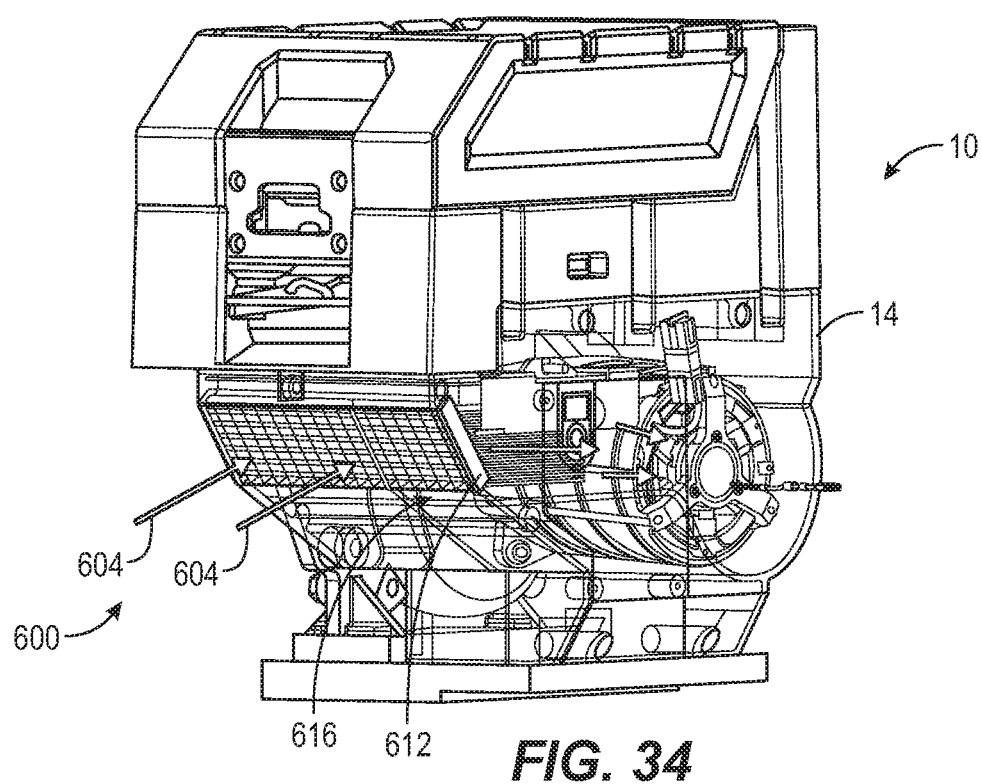
FIG. 34 is a perspective view of the stand-alone motor unit of FIG. 1 including the air filtering system of FIG. 33 in a second configuration.
Figure 35:
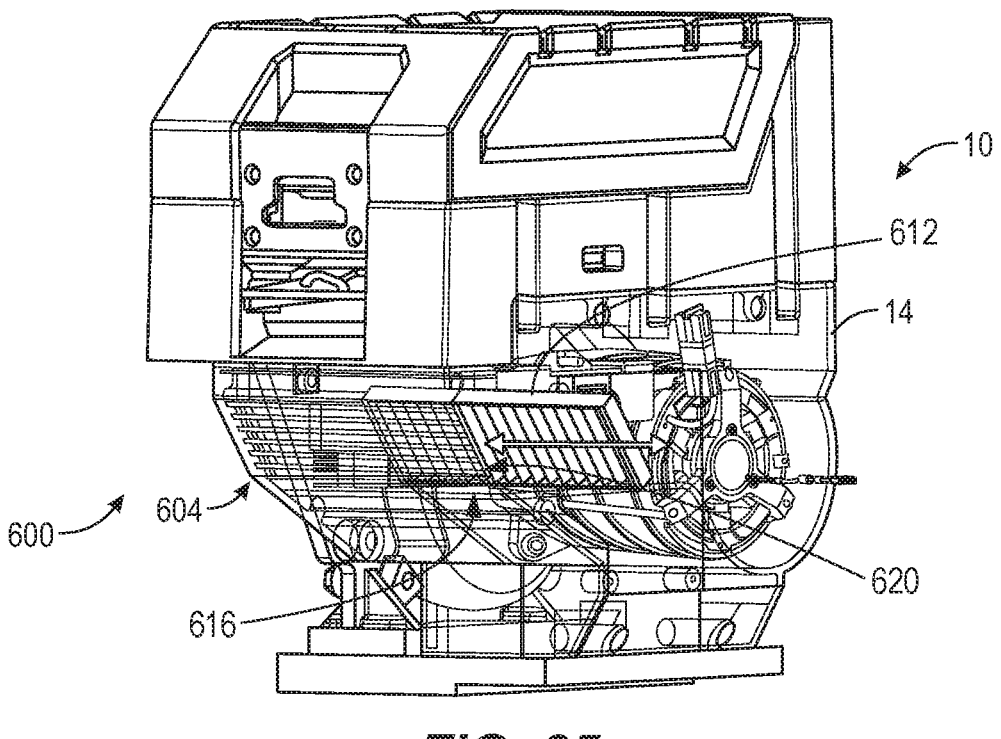
FIG. 35 is a perspective view of the stand-alone motor unit of FIG. 1 including the air filtering system of FIG. 33 in the second configuration.

With reference to FIGS. 34 and 35, in another embodiment, the air filtering system 600 includes a removable and replaceable filter 612 supported within the housing 14 adjacent the vents 604. The housing 14 defines a filter receptacle 616 that receives the filter 612 and supports the filter 612 adjacent the vents 604. The filter receptacle 616 includes a filter opening 620, and the filter 612 can be inserted into or removed from the filter receptacle 616 by sliding the filter 612 through the filter opening 620 along the direction of the arrows shown in FIG. 35. During operation of the motor unit 10, the fan 108 (FIG. 7) draws cooling air through the vents 604 and into the housing 14. The cooling air entering the housing 14 first passes through the filter 612 before reaching the motor 36, the control electronics 42, or other cooled components (e.g., battery pack 50). The filter 612 removes debris and particulates from the cooling air entering into the housing 14. Since the filter 612 is removable and replaceable, the user can decide whether to install the filter 612 when operating the motor unit 10, depending on environmental conditions at the use location (e.g., whether the environment contains airborne debris and/or particulates, etc.).

Figure 36:
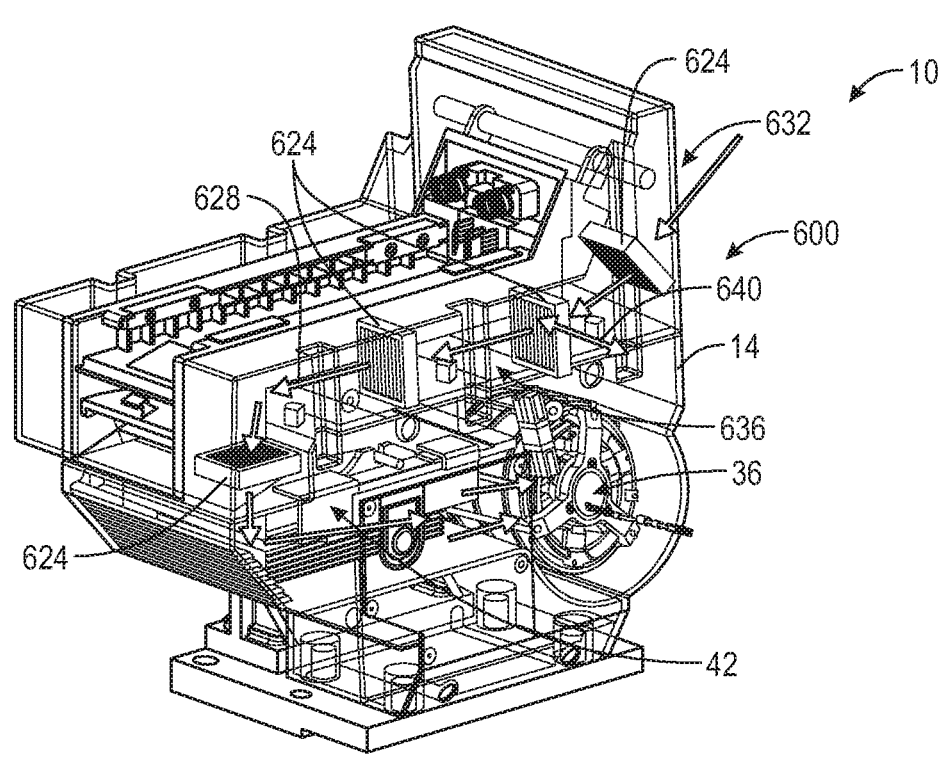
FIG. 36 is a perspective view of the stand-alone motor unit of FIG. 1 including the air filtering system of FIG. 33 in a third configuration.
Figure 37:
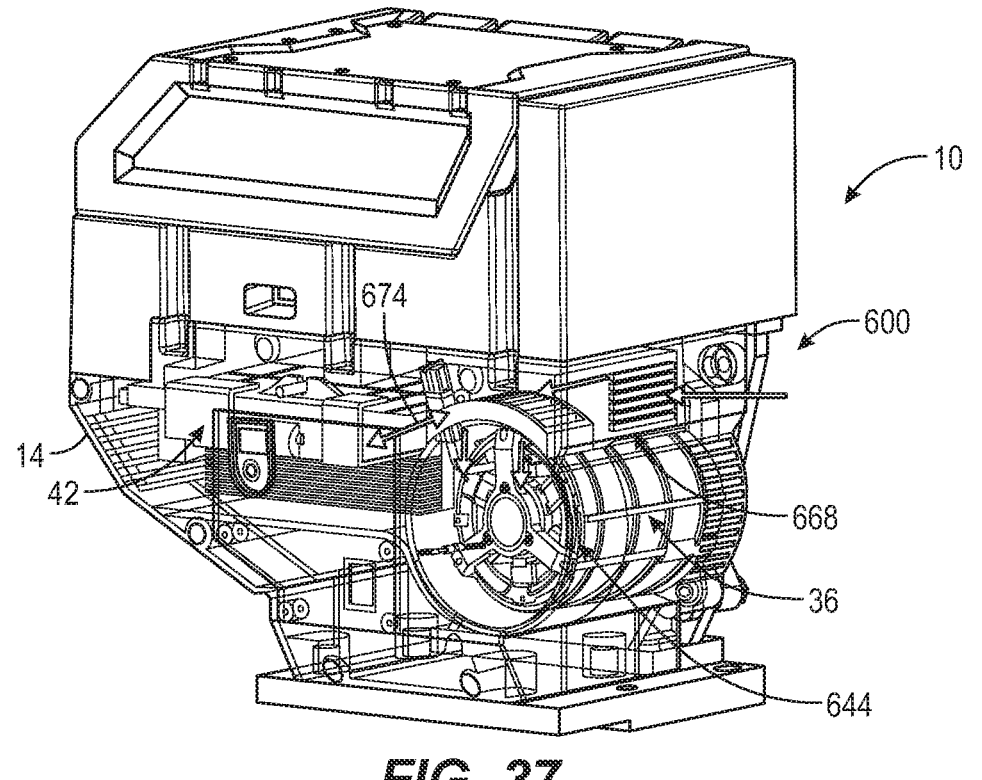
FIG. 37 is a perspective view of the stand-alone motor unit of FIG. 1 including the air filtering system of FIG. 33 in a fourth configuration.
Figure 38:
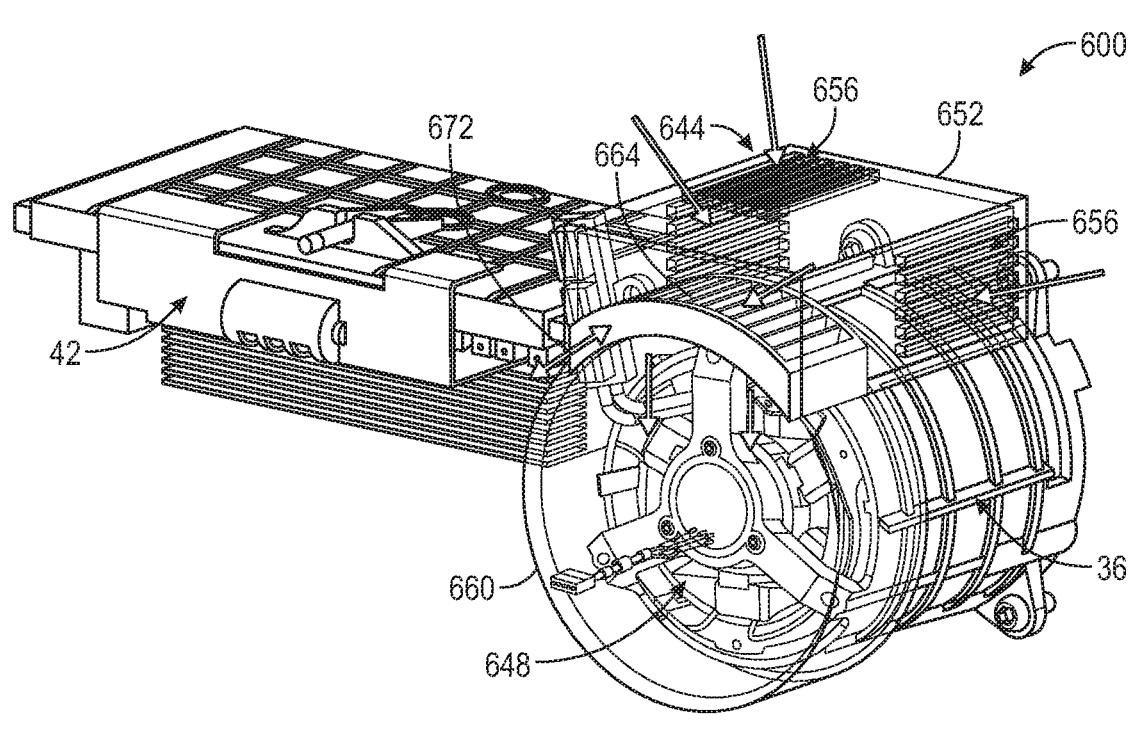
FIG. 38 is a perspective view of the air filtering system of FIG. 33 in the fourth configuration.

With reference to FIG. 36, in another embodiment, the air filtering system 600 includes multiple replaceable filters 624 arranged in series along a flow path 628 designated by the arrows in FIG. 36. The filtering system 600 also includes vents 632 defined by the housing 14 adjacent the battery receptacle 54, and a flow channel 636 that extends through portions of the battery receptacle 54 between the vents 632 and the control electronics 42. The housing 14 defines multiple filter receptacles (not shown) located sequentially along the flow channel 636. The filter receptacles receive and support the filters 624, such that cooling air entering through the vents 632 and passing through the flow channel 636 encounters each filter 624 sequentially. Each filter 624 can be inserted into or removed from the respective filter receptacle by sliding the filter 624 along the direction of the arrows 640 shown in FIG. 36. Since the filters 624 are removable and replaceable, the user can decide whether to install the filters 624 (and how many filters 624 to install) when operating the motor unit 10, depending on environmental conditions at the use location (e.g., whether the environment contains airborne debris and/or particulates, etc.).

The multiple filters 624 of the air filtering system 600 can differ or range in filtering capacity. For example, some of the filters 624 can be configured to remove coarse debris from the cooling air (e.g., those filters 624 located proximate the vents 632), while others of the filters 624 can be configured to remove fine debris and/or particulates from the cooling air (e.g., those filters 624 located proximate the control electronics 42). In this regard, the air filtering system 600 shown in FIG. 36 is customizable by the user depending upon environmental needs.

With reference to FIGS. 37-40, in another embodiment, the air filtering system 600 includes an air filter box 644 supported within the housing 14 adjacent a motor fan inlet 648. The filter box 644 filters cooling air that first enters the motor 36 via the motor fan inlet 648, and then discharges via a motor fan outlet (not shown) and moves past the control electronics 42. The filter box 644 includes an inlet plenum portion 652 (FIG. 38) that defines multiple inlet vents 656, a filter plenum portion 660 located adjacent the motor fan inlet 648, and a filter portion 664 located between the inlet and filter plenum portions 652 and 660 for capturing debris and/or particulates from the cooling air. The housing 14 defines a filter receptacle 668 (FIG. 37) that receives the filter box 644 and supports the filter box 644 adjacent the motor fan inlet 648. The filter receptacle 668 includes a filter opening (not shown), and the filter box 644 can be inserted into or removed from the filter receptacle 668 by sliding the filter box 644 through the filter opening along the direction of the arrows 672 shown in FIG. 38. Like the filters 608, 612, 624 described above, the filter box 644 is removable and replaceable. This allows the user to decide whether to install the filter box 644 when operating the motor unit 10, depending on environmental conditions at the use location (e.g., whether the environment contains airborne debris and/or particulates, etc.).

Figure 39:
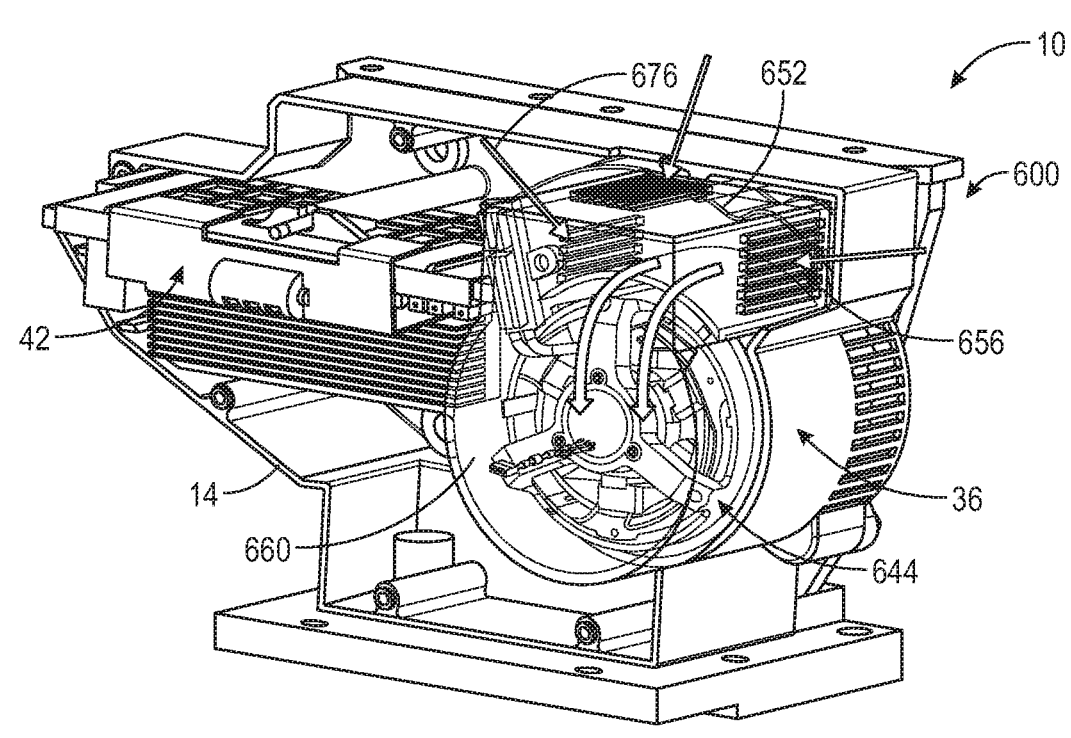
FIG. 39 is a perspective view of the stand-alone motor unit of FIG. 1 with portions removed, including the air filtering system of FIG. 33 in the fourth configuration.
Figure 40:
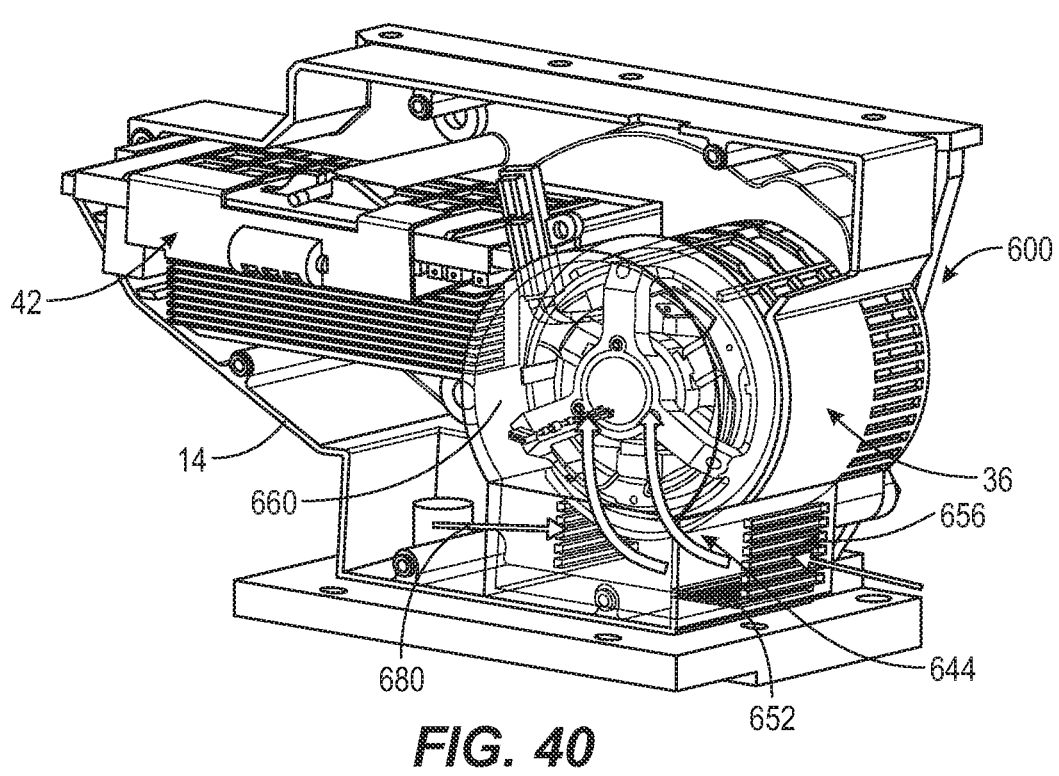
FIG. 40 is a perspective view of the stand-alone motor unit of FIG. 1 with portions removed, including the air filtering system of FIG. 33 in the fourth configuration.

With reference to FIGS. 39-40, the air filter box 644 of the air filtering system 600 can be located independent from the location/orientation of the control electronics 42. This configuration enables a specific air intake path that avoids a source of dust, debris, or other contaminants. In the embodiment shown in FIG. 39, the filter box 644 is oriented relative to the housing 14 such that the inlet vents 656 are located toward a top of the motor unit 10, adjacent the battery receptacle 54. Such an orientation of the filter box 644 reduces ingress of directly sprayed water along the direction of the arrow 676 in FIG. 39. In contrast, in the embodiment shown in FIG. 40, the filter box 644 is oriented relative to the housing 14 such that the inlet vents 656 are located toward a bottom of the motor unit 10, adjacent the flange 34. Such an orientation of the filter box 644 reduces ingress of directly sprayed water along the direction of the arrow 680 in FIG. 40.

Figure 41:
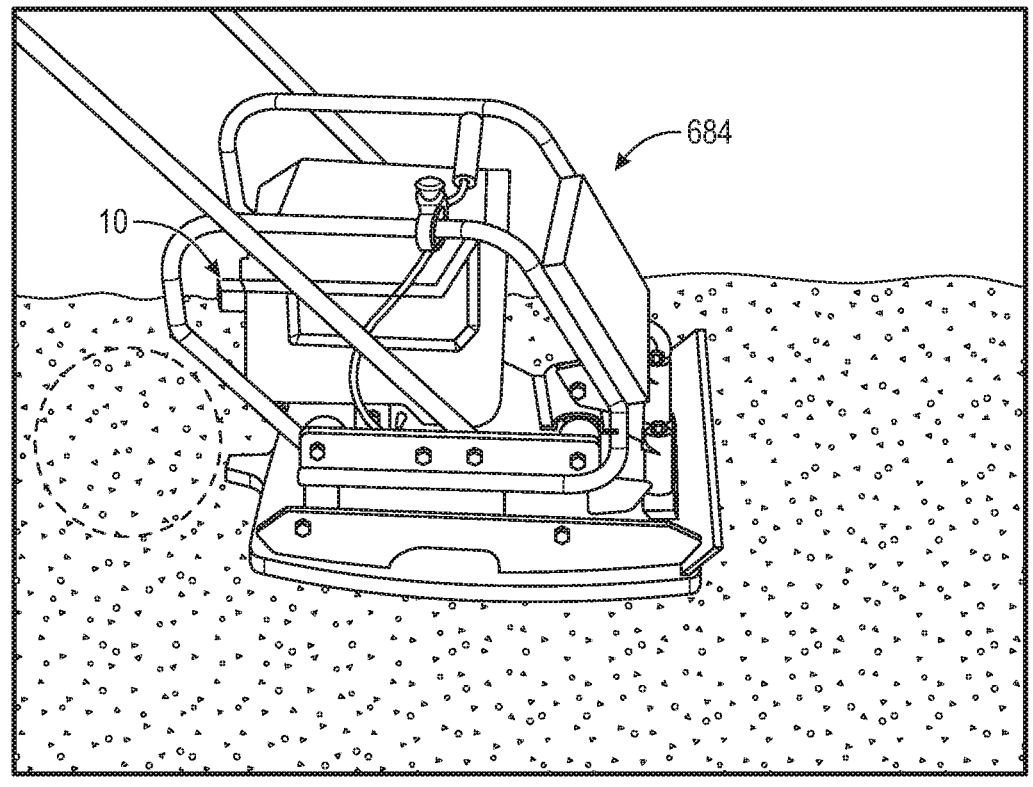
FIG. 41 is a perspective view of a plate compactor that includes the stand-alone motor unit of FIG. 1.

FIG. 41 illustrates a plate compactor 684 that utilizes the motor unit 10 as a source of motive power. In operation, dust is most prevalent behind the plate compactor 684, in the region designated by the dotted line in FIG. 41. The air filtering system 600 of FIGS. 37-40 can be utilized in the motor unit 10 of the plate compactor 684 with the filter box 644 located so as to draw in ambient air from a direction away from the dotted line region of FIG. 41.

With reference to FIGS. 42-45, the motor unit 10 can include a cooling system 700 for removing heat from components of the motor unit 10 (e.g., the motor 36, the control electronics 42, the battery pack 50, etc.) during operation thereof. In the embodiment shown in FIG. 42, the cooling system 700 utilizes ambient cooling air to first cool the control electronics 42 and then subsequently cool the motor 36. The motor unit 10 includes rear vents 704 formed in the housing 14 adjacent the control electronics 42, and front vents 708 formed in the housing 14 adjacent a motor fan outlet 724 (FIG. 45) of the motor 36.

Figure 42:
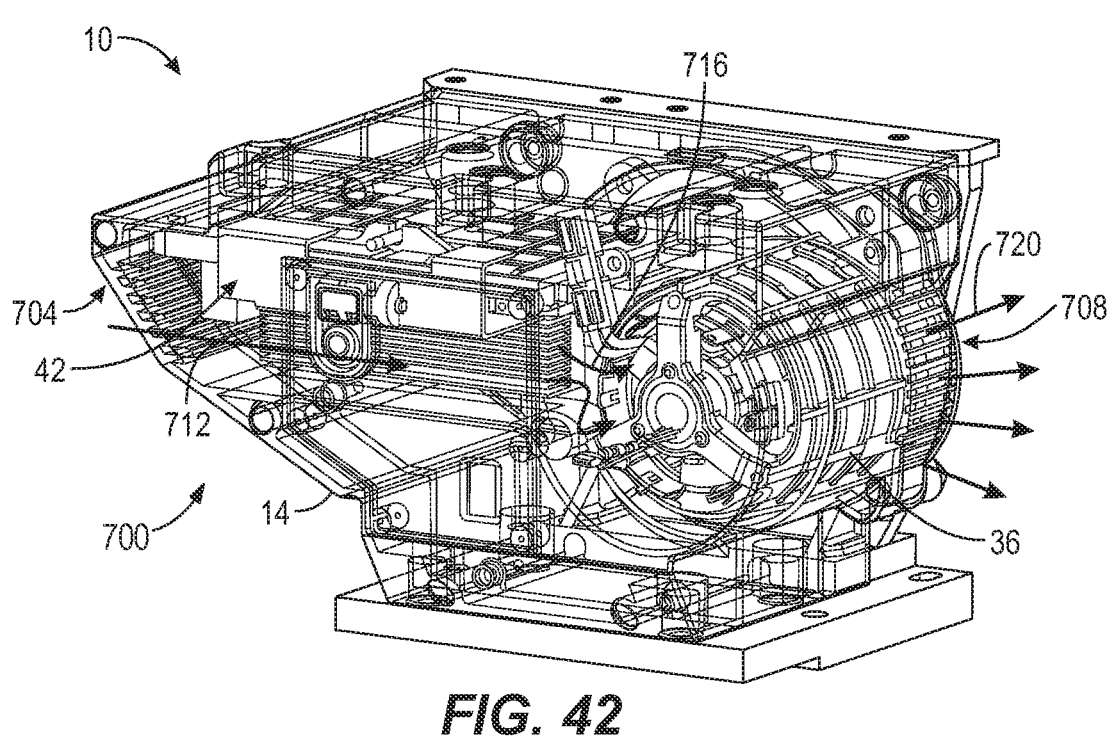
FIG. 42 is a perspective view of the stand-alone motor unit of FIG. 1 with portions removed, including a cooling system in a first configuration.

During operation of the motor unit 10, ambient cooling air enters the housing 14 via the rear vents 704, flows through the housing 14 along a flow path designated by first, second, and third arrows 712, 716, 720 in FIG. 42, and exits the housing 14 via the front vents 708. Specifically, the fan 108 (FIG. 7) generates a negative pressure within the housing 14, causing the ambient cooling air to be drawn into the housing 14 through the rear vents 704 and flow toward the motor 36. The cooling air first encounters and passes by the control electronics 42 in a direction of the first arrow 712 shown in FIG. 42, and carries away heat from the control electronics 42. Upon reaching the motor 36, the cooling air is warmed due to the heat acquired from the control electronics 42. The warmed cooling air enters the motor 36 in a direction of the second arrows 716 shown in FIG. 42, and passes through the motor 36 to carry away heat from the motor 36. The cooling air is then discharged out the motor fan outlet 724, and exhausted from the housing 14 through the front vents 708 along a direction of the third arrows 720 of FIG. 42.

Figure 43:
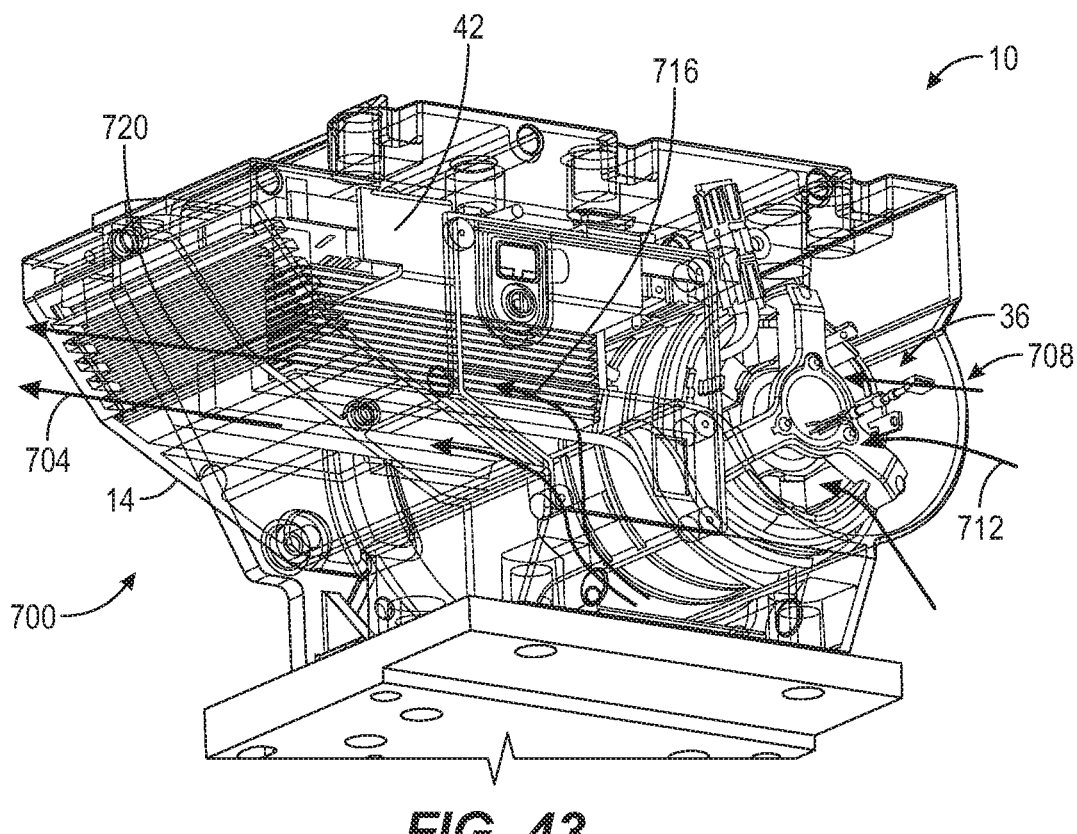
FIG. 43 is a perspective view of the stand-alone motor unit of FIG. 1 with portions removed, including the cooling system of FIG. 42 in a second configuration.
Figure 44:
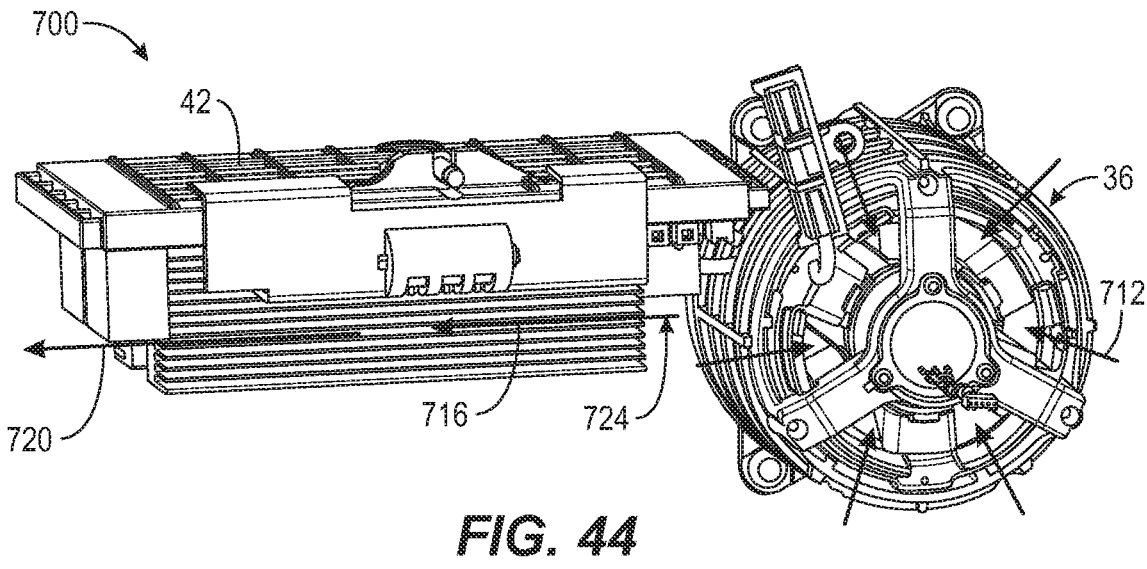
FIG. 44 is a perspective view of the cooling system of FIG. 42 in the second configuration, with portions removed.
Figure 45:
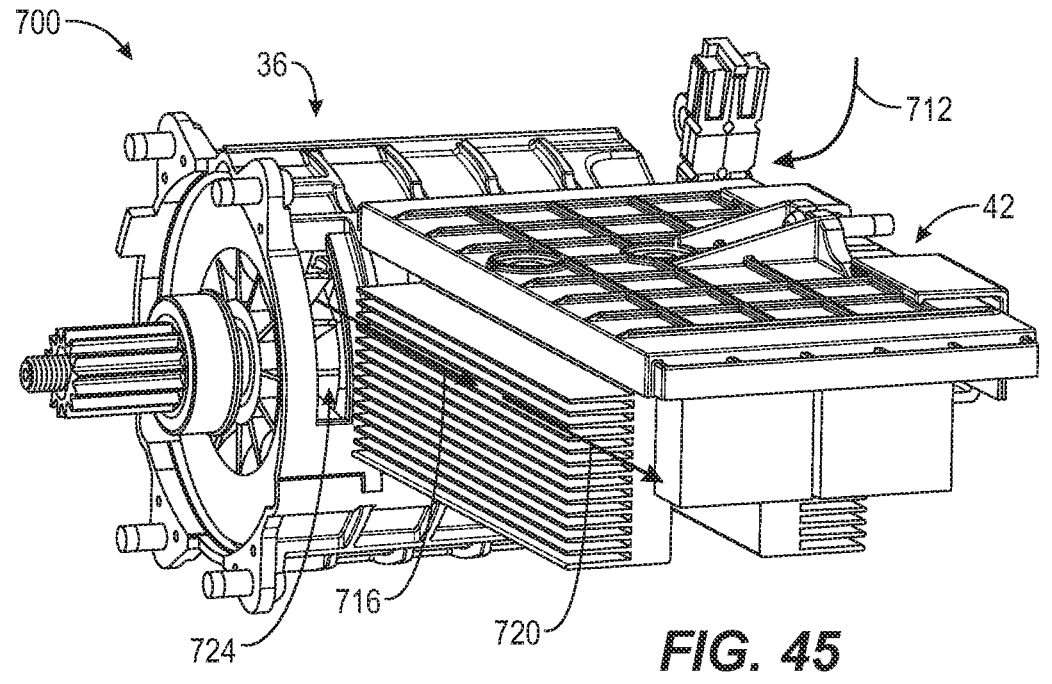
FIG. 45 is another perspective view of the cooling system of FIG. 42 in the second configuration, with portions removed.
Figure 46:
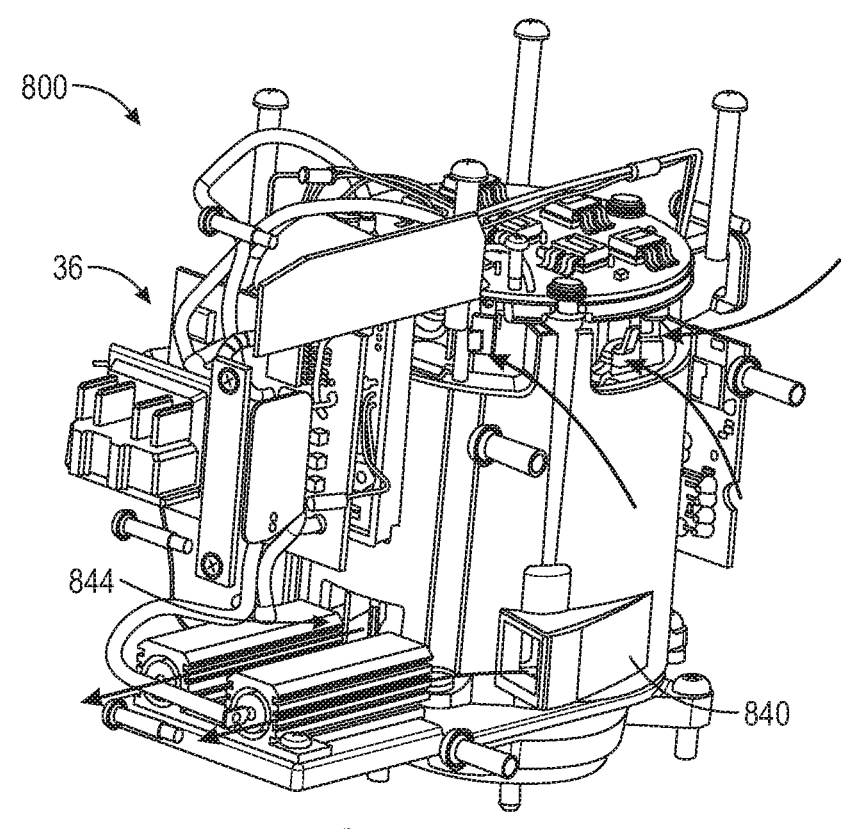
FIG. 46 is a perspective view of a ducted cooling system of the stand-alone motor unit of FIG. 1 in a first configuration.

With reference FIGS. 43-45, in another embodiment, the cooling system 700 utilizes ambient cooling air to first cool the motor 36 and then subsequently cool the control electronics 42. The ambient cooling air enters the housing 14 via the front vents 708, flows through the housing 14 along a flow path designated by first, second, and third arrows 712, 716, 720 in FIG. 43, and exits the housing 14 via the rear vents 704. Upon entering the housing 14 via the front vents 708 along a direction of the first arrows 712, the cooling air first encounters and passes through the motor 36. The cooling air exiting the motor 36 is warmed due to the heat acquired from the motor 36. The warmed cooling air then encounters and passes by the control electronics 42 in a direction of the second and third arrows 716, 720, and acquires additional heat from the control electronics 42. Finally, the cooling air is exhausted out of the housing 14 via the rear vents 704. The warmed cooling air exhausted from the motor 36 exits via the motor fan outlet 724 (FIG. 45). The motor fan outlet 724 is located facing toward the control electronics 42 (FIG. 45), so that the warmed cooling air is directed toward the control electronics 42.

Using ambient cooling air to first cool the motor 36, rather than warmed cooling air that has previously cooled the control electronics 42 (FIG. 42), will improve heat removal from permanent magnets (not shown) within the motor 36. This improves durability and longevity of the motor 36, by preventing de-magnetization of the permanent magnets that can occur at higher temperatures. Warmed cooling air exiting the motor 36 will also enable more moisture removal from the control electronics 42.

With reference to FIGS. 46-49, the motor unit 10 can include a ducted cooling system 800 for removing heat from components of the motor unit 10 (e.g., the motor 36, the control electronics 42, etc.) during operation thereof. In the embodiment shown in FIG. 46, the ducted cooling system 800 can include a duct 840 located proximate a motor fan outlet 844 of the motor 36, to direct cooling air exhausted from the motor 36 toward the control electronics 42 and the battery pack 50.

Figure 47:
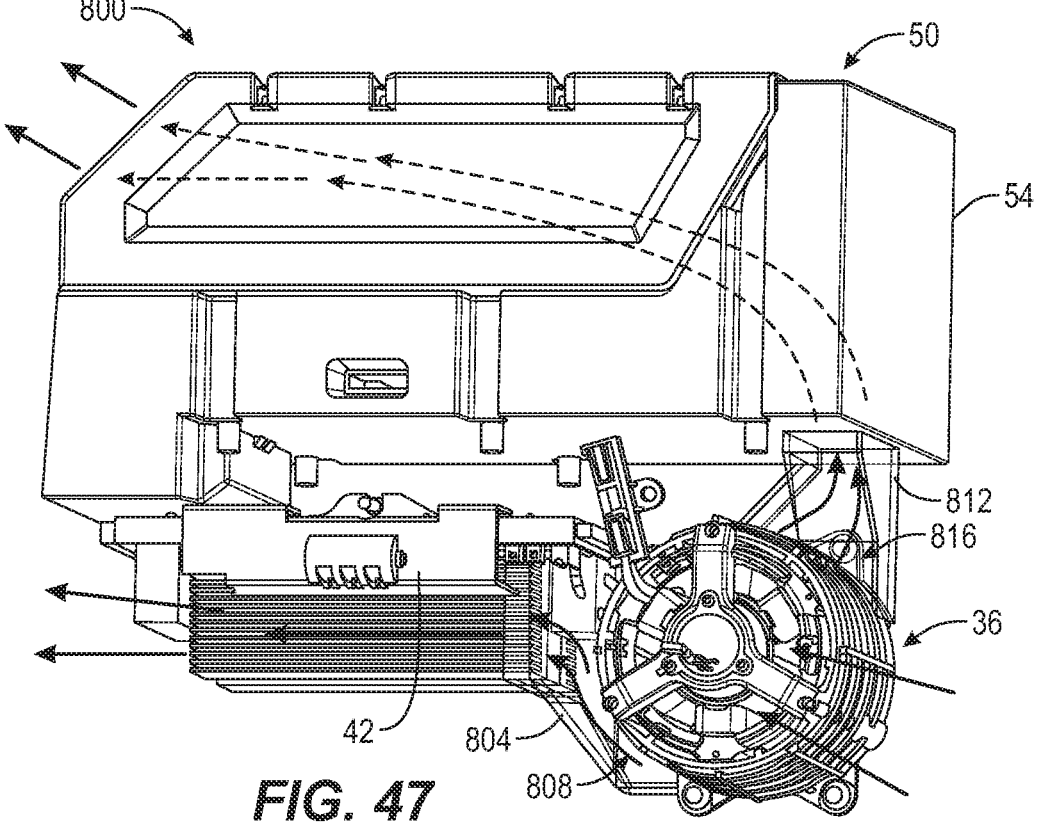
FIG. 47 is a perspective view of the ducted cooling system of FIG. 46 in a second configuration.

In the embodiment shown in FIG. 47, the ducted cooling system 800 can include a first duct 804 extending between a first motor fan outlet 808 and the control electronics 42, and a second duct 812 extending between a second motor fan outlet 816 and the battery receptacle 54. Cooling air exhausted from the motor 36 exits through the first and second motor fan outlets 808, 816 and passes through the first and second ducts 804, 812. Cooling air passing through the first duct 804 is directed toward the control electronics 42, and cooling air passing through the second duct 812 is directed toward the battery receptacle 54 to cool the battery pack 50.

Figure 48:
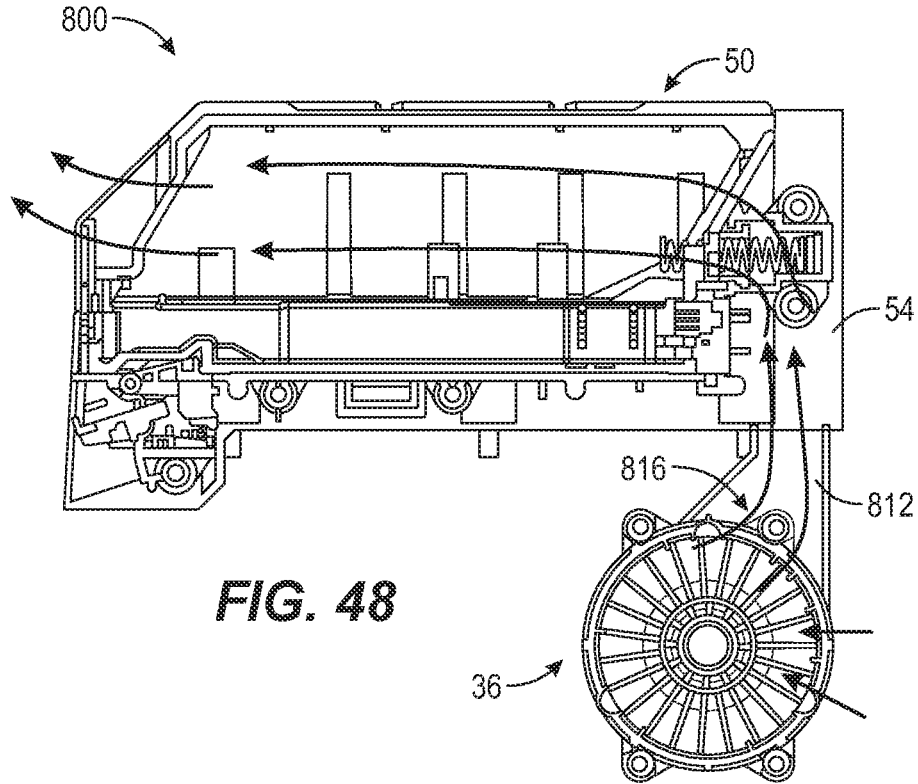
FIG. 48 is a perspective view of the ducted cooling system of FIG. 46 in a third configuration.

In the embodiment shown in FIG. 48, the ducted cooling system 800 includes only the second duct 812 extending between the second motor fan outlet 816 and the battery receptacle 54. Cooling air exhausted from the motor 36 exits through the second motor fan outlet 816 and passes through the second duct 812. The cooling air passing through the second duct 812 is directed toward the battery receptacle 54 to cool the battery pack 50.

Figure 49:
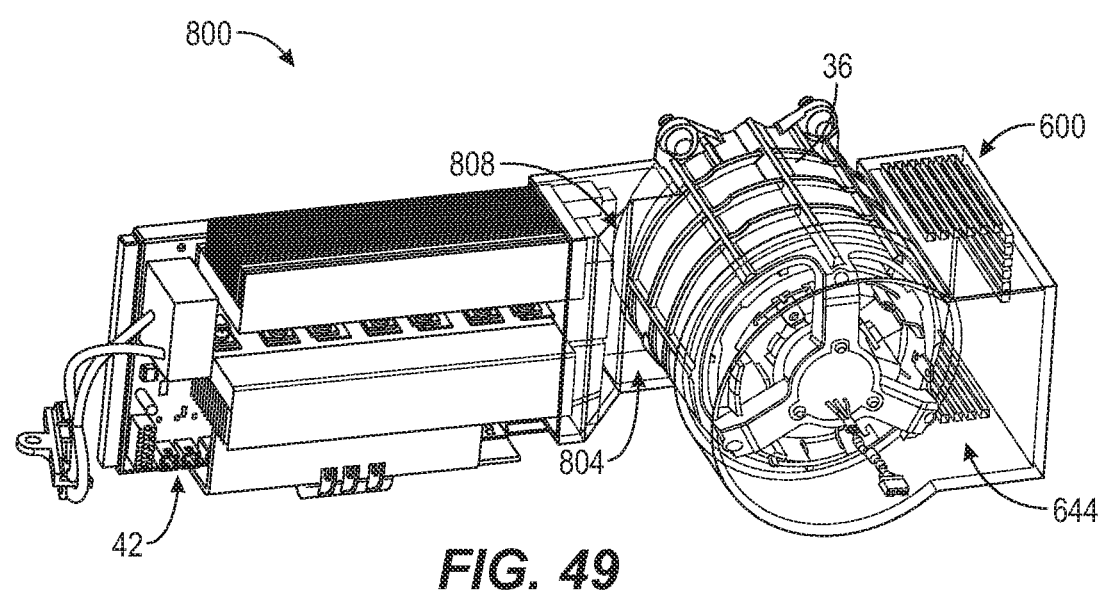
FIG. 49 is a perspective view of the ducted cooling system of FIG. 46 in a fourth configuration.

In the embodiment shown in FIG. 49, the ducted cooling system 800 includes only the first duct 804 extending between the first motor fan outlet 808 and the control electronics 42. Cooling air exhausted from the motor 36 exits through the first motor fan outlet 808 and passes through the first duct 804. The cooling air passing through the first duct 804 is directed toward the control electronics 42 to cool the control electronics 42. The ducted cooling system 800 of FIG. 49 can be combined with the air filtering system 600 having the air filter box 644, to filter the ambient cooling air prior to the cooling air entering the motor 36.

As discussed above, the cooling system 700 and the ducted cooling system 800 utilize the cooling air exhausted from the motor 36 to cool the control electronics 42 and/or the battery pack 50. One benefit to routing exhausted cooling air from the motor 36 through the control electronics 42 and/or the battery pack 50 is the ability to control the exhaust air flow better than the intake air flow. This is due to controllable restrictions on the motor fan outlets 808, 816 (FIG. 47) and the ducts 804, 812 (FIGS. 48 and 49). Inlet air flow is more difficult to control than exhaust airflow, due to potential interference with the motor wiring (not shown), and the potential for outside air to leak around the seams of the housing 14. The cooling air passing through the ducts 804, 812 is more effectively directed to flow over the control electronics 42, improving moisture removal and cleaning of electronic surfaces. The ducts 804, 812 also enable more options for orientation of the control electronics 42 with respect to the motor 36, since the exhausted cooling air will be better controlled than cooling air passing through the housing 14 into the motor 36. And, using cooler ambient air to cool the motor 36 before cooling the control electronics 42 and the battery pack 50 will improve heat removal from the motor 36, as discussed above.

Various features of the disclosure are set forth in the following claims.

What is claimed is:

1. A stand-alone motor unit for use with a piece of power equipment, the motor unit comprising:
   a housing;
   a flange coupled to the housing on a first side thereof, the flange configured to couple the motor unit to the piece of power equipment;
   an electric motor;
   a first fan driven by the electric motor and configured to induce an airflow through the electric motor;
   a power take-off shaft receiving torque from the electric motor;
   control electronics positioned within the housing and electrically connected to the electric motor;
   a battery pack;
   a battery receptacle coupled to the housing and engageable with the battery pack to transfer current between the battery pack and the electric motor; and
   an auxiliary cooling system located within the housing, the auxiliary cooling system including
      a heat sink coupled to the control electronics, and a second fan configured to direct an airflow across the heat sink separate from the airflow induced through the electric motor by the first fan.

2. The stand-alone motor unit of claim 1, wherein the electric motor is a first electric motor, and the auxiliary cooling system further includes a second electric motor configured to drive the second fan.

3. The stand-alone motor unit of claim 2, wherein the second electric motor is configured to dynamically increase in rotating speed.

4. The stand-alone motor unit of claim 2, wherein the auxiliary cooling system further includes a third fan configured to direct an airflow across the heat sink separate from the airflow induced by the first and second fans.

5. The stand-alone motor unit of claim 4, wherein the second electric motor is further configured to drive the third fan.

6. The stand-alone motor unit of claim 4, wherein the auxiliary cooling system further includes a third electric motor configured to drive the third fan.

7. The stand-alone motor unit of claim 1, further comprising a liquid cooling circuit including a heat exchanger coupled to at least one of the electric motor or the control electronics, and a pump configured to circulate a working fluid through the heat exchanger to absorb heat therefrom.

8. The stand-alone motor unit of claim 1, wherein the second fan is located adjacent a first longitudinal end of the heat sink, and the electric motor is located adjacent a second longitudinal end of the heat sink opposite the first longitudinal end.

9. The stand-alone motor unit of claim 8, wherein the airflow flows across the heat sink and around the electric motor.

10. The stand-alone motor unit of claim 1, wherein the airflow directed across the heat sink by the second fan is a first airflow, and wherein the auxiliary cooling system includes a third fan that directs a second airflow across the electric motor, the second airflow being separate from the first airflow.

11. The stand-alone motor unit of claim 1, wherein the power take-off shaft defines a rotational axis, and wherein the heat sink includes a fin that extends generally transverse to the rotational axis of the power take-off shaft.

* * * * *